US012443134B2

(12) United States Patent
Minagawa et al.

(10) Patent No.: US 12,443,134 B2
(45) Date of Patent: Oct. 14, 2025

(54) BOOKLET FORMING DEVICE AND IMAGE FORMING APPARATUS

(71) Applicant: CANON KABUSHIKI KAISHA, Tokyo (JP)

(72) Inventors: Taisuke Minagawa, Shizuoka (JP); Kenji Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/736,854

(22) Filed: Jun. 7, 2024

(65) Prior Publication Data

US 2024/0427269 A1 Dec. 26, 2024

(30) Foreign Application Priority Data

Jun. 20, 2023 (JP) ................................ 2023-100817

(51) Int. Cl.

| | |
|---|---|
| ***G03G 15/00*** | (2006.01) |
| ***B42C 1/00*** | (2006.01) |
| ***B42C 9/00*** | (2006.01) |
| *B42C 1/12* | (2006.01) |

(52) U.S. Cl.

CPC ....... *G03G 15/6541* (2013.01); *B42C 9/0081* (2013.01); *G03G 15/6544* (2013.01); *B42C 1/12* (2013.01); *G03G 2215/00835* (2013.01); *G03G 2215/00936* (2013.01)

(58) Field of Classification Search

CPC ........... G03G 15/6541; G03G 15/6544; G03G 2215/00835; G03G 2215/00936; B42C 1/12; B42C 9/0081; B42C 9/0093

USPC .......................................................... 399/409

See application file for complete search history.

(56) References Cited

U.S. PATENT DOCUMENTS

| | | | | |
|---|---|---|---|---|
| 6,712,924 B2 * | 3/2004 | Silverbrook | B42C 9/0081 | 412/8 |
| 2001/0019691 A1 * | 9/2001 | Boss | B42C 9/0093 | 412/22 |
| 2009/0035002 A1 * | 2/2009 | Kushida | B42C 9/0081 | 399/53 |
| 2013/0051886 A1 * | 2/2013 | Watanabe | G03G 15/6544 | 399/409 |

(Continued)

FOREIGN PATENT DOCUMENTS

| | | | |
|---|---|---|---|
| JP | 2004209859 A * | 7/2004 | B42C 9/0081 |
| JP | 2005231875 A | 9/2005 | |

*Primary Examiner* — Robert B Beatty

(74) *Attorney, Agent, or Firm* — ROSSI, KIMMS & McDOWELL LLP

(57) ABSTRACT

A booklet forming device includes a sheet support portion, and a bonding unit including a pressurizing member and configured to form a bonding layer. In a case of forming a first booklet including a first number of sheets, the bonding unit is operated under a first operation condition so that a thickness of the bonding layer positioned closest to the pressurizing member in the first booklet becomes a first thickness. In a case of forming a second booklet including a second number of sheets more than the first number of sheets, the bonding unit is operated under a second operation condition different from the first operation condition so that the thickness of the bonding layer positioned closest to the pressurizing member in the second booklet becomes a second thickness larger than the first thickness.

20 Claims, 8 Drawing Sheets

(56) References Cited

U.S. PATENT DOCUMENTS

| | | | | |
|---|---|---|---|---|
| 2014/0072388 | A1* | 3/2014 | Hashimoto | G03G 15/6544 412/1 |
| 2015/0251475 | A1* | 9/2015 | Taguchi | B42C 13/00 412/37 |
| 2017/0217239 | A1* | 8/2017 | Suzuki | B42C 19/08 |
| 2024/0326504 | A1* | 10/2024 | Uchida | B42C 1/12 |

* cited by examiner

BOOKLET FORMING DEVICE AND IMAGE FORMING APPARATUS

BACKGROUND OF THE INVENTION

Field of the Invention

The present invention relates to a booklet forming device for forming a booklet and an image forming apparatus including the same.

Description of the Related Art

JP 2005-231875 A discloses an image forming apparatus in which an operation of heating and pressurizing three sheet materials on which a toner layer for bonding is formed at a time with a heating and pressurizing member is repeated to produce a sheet material bundle of a larger number of sheets.

However, in the image forming apparatus described in JP 2005-231875 A, in the sheet material bundle as a product, a region where the toner layer for bonding is formed is recessed as compared with a region where the toner layer for bonding is not formed, and the quality of the product may be deteriorated.

SUMMARY OF THE INVENTION

According to a first aspect of the present invention, a booklet forming device for forming a booklet by bonding a plurality of sheets, the booklet forming device includes a sheet support portion configured to support sheet onto which a toner for bonding is applied, and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer. In a case of forming a first booklet including a first number of sheets, the bonding unit is operated under a first operation condition so that a thickness of the bonding layer positioned closest to the pressurizing member in the first booklet becomes a first thickness. In a case of forming a second booklet including a second number of sheets more than the first number of sheets, the bonding unit is operated under a second operation condition different from the first operation condition so that the thickness of the bonding layer positioned closest to the pressurizing member in the second booklet becomes a second thickness larger than the first thickness.

According to a second aspect of the present invention, a booklet forming device for forming a booklet by bonding a plurality of sheets, the booklet forming device includes a sheet support portion configured to support sheet onto which a toner for bonding is applied, and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer. In a case of forming a first booklet including a first number of sheets, the pressurizing member pressurizes the first number of sheets at a first pressure. In a case of forming a second booklet including a second number of sheets more than the first number of sheets, the pressurizing member pressurizes the second number of sheets at a second pressure lower than the first pressure.

According to a third aspect of the present invention, a booklet forming device for forming a booklet by bonding a plurality of sheets, the booklet forming device includes a sheet support portion configured to support sheet onto which a toner for bonding is applied, and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer. In a case of forming a first booklet including a first number of sheets, a surface temperature of the pressurizing member is set to a first temperature. In a case of forming a second booklet including a second number of sheets more than the first number of sheets, the surface temperature of the pressurizing member is set to a second temperature lower than the first temperature.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

First Embodiment

Overall Configuration of Image Forming Apparatus

Figure 1:
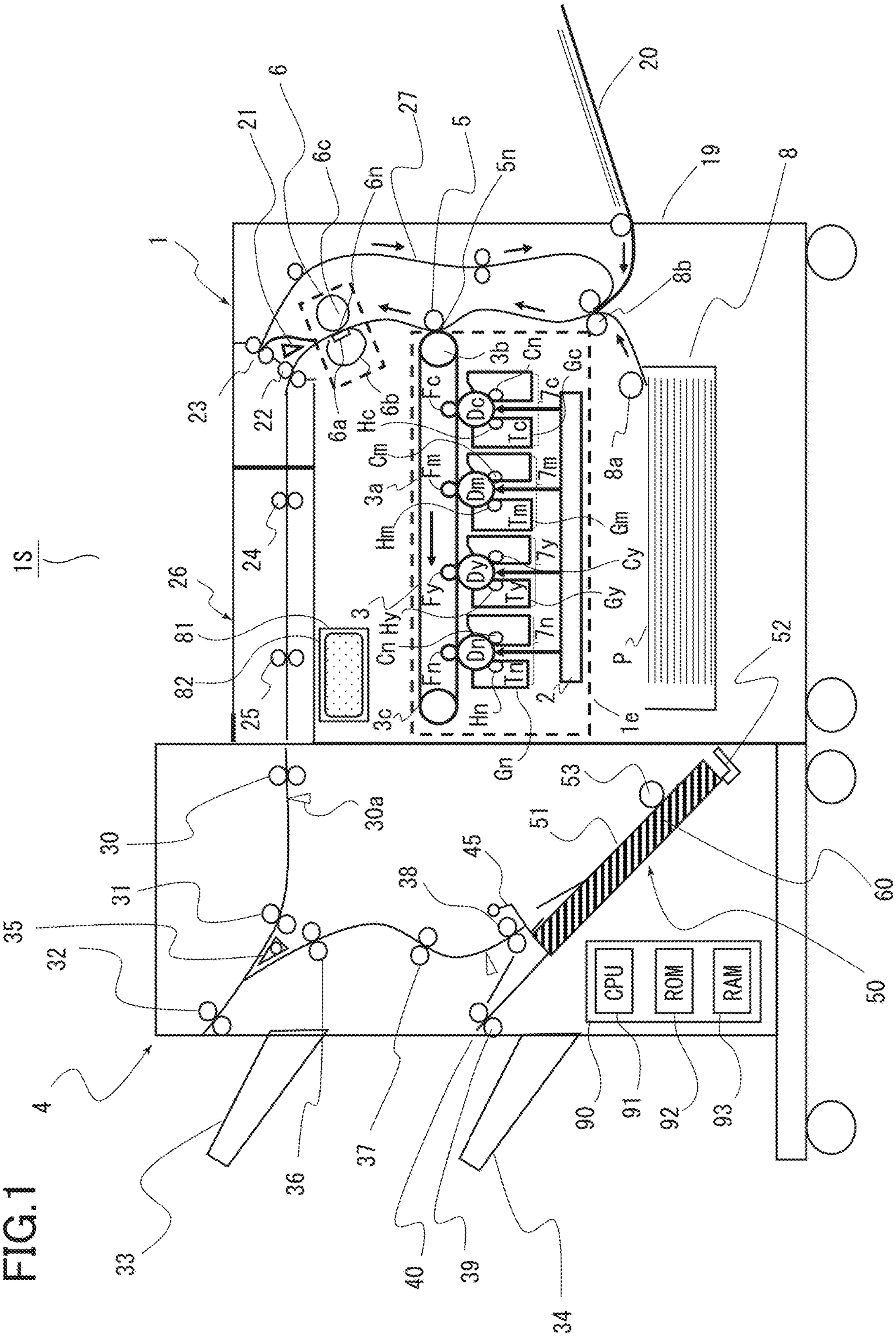
FIG. 1 is a schematic view illustrating a cross-sectional configuration of an image forming apparatus according to a first embodiment.

First, an overall configuration of an image forming apparatus will be described with reference to FIG. 1. FIG. 1 is a schematic view illustrating a cross-sectional configuration of an image forming apparatus 1S according to a first embodiment.

The image forming apparatus 1S includes a printer unit 1 (image forming apparatus body) including an electrophotographic image forming unit 1*e*, an intermediate conveyance unit 26 connected to the printer unit 1, and a post-processing device 4 (sheet processing device) connected to the intermediate conveyance unit 26. The image forming apparatus 1S is an image forming system including a plurality of devices. However, functions of the respective devices included in the image forming apparatus 1S of the present embodiment may be arranged in one casing.

As illustrated in FIG. 1, the printer unit 1 includes a cassette 8 that stores a sheet P, the image forming unit 1*e* (in a frame of a broken line) serving as an image forming unit, a fixing device 6 serving as a fixing unit, and a casing 19 that houses the cassette 8, the image forming unit 1*e*, and the fixing device 6. The printer unit 1 has a printing function (image forming function) of forming a toner image on the sheet P fed from the cassette 8 by the image forming unit 1*e* and performing fixing processing by the fixing device 6 to form a printed matter. As the sheet P serving as a recording material (recording medium), various sheet materials having different sizes and materials, such as a plastic film, cloth, and paper such as plain paper or thick paper, a sheet material subjected to surface treatment such as coated paper, a sheet material having a special shape such as an envelope or index paper can be used.

In the present embodiment, the maximum size of the sheet P on which an image can be formed by the printer unit 1 is A4 size (297 mm in length×210 mm in width). In addition, the printer unit 1 can perform image formation by conveying the sheet P of A4 size in a longitudinal direction (a long side feeding direction or a direction in which a longitudinal side of the sheet P of A4 size is parallel to a sheet conveyance direction).

The image forming unit 1*e* is a tandem intermediate transfer electrophotographic unit including four process cartridges 7*n*, 7*y*, 7*m*, and 7*c*, a scanner unit 2 serving as an exposure device, and a transfer unit 3. The process cartridge is a unit in which a plurality of components responsible for an image forming process are integrally replaceable.

As described below, the image forming unit 1*e* also functions as an application unit that applies an adhesive to the sheet P. The image forming apparatus 1S including the image forming unit 1*e* serving as the application unit and a booklet making device 50 described below is an example of a sheet bonding apparatus that creates a product in which the sheets P are bonded to each other.

Each of the process cartridges 7*n*, 7*y*, 7*m*, and 7*c* has a substantially common configuration except for the type of powder contained in four powder containers Gn, Gy, Gm, and Gc. That is, each of the process cartridges 7*n*, 7*y*, 7*m*, and 7*c* includes photosensitive drums Dn, Dy, Dm, and Dc serving as image bearing members, charging rollers Cn, Cy, Cm, and Cc serving as chargers, and the powder containers Gn, Gy, Gm, and Gc. Each of the charging rollers Cn, Cy, Cm, and Cc functions as a charging unit that charges the corresponding photosensitive drum Dn, Dy, Dm, or Dc. Each of the powder containers Gn, Gy, Gm, and Gc contains a toner that is powder. The powder containers Gn, Gy, Gm, and Gc are provided with developing rollers Hn, Hy, Hm, and Hc serving as developer bearing members that bear the toner, and the developing rollers Hn, Hy, Hm, and Hc supply the toner to the corresponding photosensitive drums Dn, Dy, Dm, and Dc.

Among the four process cartridges 7*n*, 7*y*, 7*m*, and 7*c*, three process cartridges 7*y*, 7*m*, and 7*c* from the right in the drawing are process cartridges for forming a visible image on the sheet P. The process cartridges 7*y*, 7*m*, and 7*c* create toner images of yellow, magenta, and cyan, respectively. The yellow, magenta, and cyan toners contained in the process cartridges 7*y*, 7*m*, and 7*c* are image formation toners (recording toners for recording information, printing toners, and image toners) for forming an image on the sheet P. That is, the powder containers Gy, Gm, and Gc of the process cartridges 7*y*, 7*m*, and 7*c* contain image toners Ty, Tm, and Tc of yellow, magenta, and cyan, respectively.

On the other hand, the process cartridge 7*n* at the left end in the drawing is a process cartridge for applying a toner for bonding (bonding toner or powder adhesive) for bonding sheets after printing onto the sheet P. The process cartridge 7*n* creates a toner image (bonding toner image) of the bonding toner for applying an adhesive onto the sheet P by an electrophotographic process similar to that of the process cartridges 7*y*, 7*m*, and 7*c*. That is, the powder container Gn of the process cartridge 7*n* contains a bonding toner Tn for bonding sheets after printing to each other. That is, some of the plurality of process cartridges 7*n*, 7*y*, 7*m*, and 7*c* included in the image forming unit 1*e* form a visible image using the image toner, and the other cartridges form an adhesive layer on the sheet P by using the bonding toner. The bonding toner may be a colorless and transparent toner or a color toner. The image forming unit 1*e* forms the bonding toner image by using the bonding toner in a bonding region on the sheet, and forms an image by using the image forming toner in an image region different from the bonding region on the sheet.

In the present embodiment, in a case of forming a black image such as text, the black color is expressed by process black obtained by superimposing the yellow, magenta, and cyan toners. However, for example, the fifth process cartridge using a black toner may be added to the image forming unit 1*e* so that a black image can be expressed by a black image toner. Not limited to this, the types of the image toner and the bonding toner, the number of image toners, and the number of bonding toners can be changed according to the application of the image forming apparatus 1S.

The scanner unit 2 is disposed below the process cartridges 7*n*, 7*y*, 7*m*, and 7*c* and above the cassette 8. The scanner unit 2 is an example of an exposure unit that forms an electrostatic latent image by irradiating and exposing the photosensitive drums Dn, Dy, Dm, and Dc of the process cartridges 7*n*, 7*y*, 7*m*, and 7*c* with laser light. The scanner unit 2 includes, for example, a semiconductor laser serving as a light source, a polygon mirror, and the like.

The transfer unit 3 of the present embodiment includes a transfer belt 3*a* serving as an intermediate transfer body (secondary image bearing member), a secondary transfer counter roller 3*b*, and a driving roller 3*c*. The transfer belt 3*a* is a belt member stretched around the secondary transfer counter roller 3*b* and the driving roller 3*c*. An outer peripheral surface of the transfer belt 3*a* faces the photosensitive drums Dn, Dy, Dm, and Dc of the process cartridges 7*n*, 7*y*, 7*m*, and 7*c*. Primary transfer rollers Fn, Fy, Fm, and Fc are arranged on an inner peripheral side of the transfer belt 3*a* at positions corresponding to the photosensitive drums Dn, Dy, Dm, and Dc. The transfer belt 3*a* is conveyed in a counterclockwise direction in the drawing by rotational driving of the driving roller 3*c*.

The printer unit 1 includes a secondary transfer roller 5 provided at a position facing the secondary transfer counter roller 3*b* via the transfer belt 3*a*. A transfer nip 5*n* between the secondary transfer roller 5 and the transfer belt 3*a* is a transfer portion (secondary transfer portion) for transferring the toner image from the transfer belt 3*a* to the sheet P.

The fixing device 6 is an example of a fixing unit that fixes the toner image formed on the sheet P to the sheet P. The fixing device 6 is a thermal fixing device (image heating device) that fixes a toner image by heating.

The fixing device 6 includes a heating film 6*b* serving as a fixing member, a ceramic heater 6*a* serving as a heat source (heating unit) incorporated in the heating film 6*b*, and a pressure roller 6*c* serving as an opposing member opposing the heating film 6*b*. The heating film 6*b* may be heated by a halogen lamp or an induction heating type heat generation mechanism. The pressure roller 6*c* is rotationally driven by a drive source (not illustrated). Further, the heating film 6*b* and the pressure roller 6*c* are brought into pressure contact with each other by an urging member such as a spring, and a fixing nip 6*n* is formed between the heating film 6*b* and the pressure roller 6*c*. That is, the sheet P is heated and pressurized when passing through the fixing nip 6*n*.

A control unit of the image forming apparatus 1S adjusts power to be input to the ceramic heater 6*a* based on a detection result of a radiation thermometer (not illustrated), thereby performing temperature control so that the heating film 6*b* has a predetermined target temperature (fixing temperature). The ceramic heater 6*a* is not limited to one that is in direct contact with the heating film 6*b*, and may be in contact with the heating film 6*b* via a sheet material having a high thermal conductivity, such as an iron alloy or aluminum.

The heating film 6*b* is a thin film formed of a high heat-resistant resin such as a polyimide resin or a polyamideimide resin, or metal such as stainless steel. A heating roller having a high stiffness may be applied instead of the heating film 6*b*.

Schematic Description of Image Toner

As the image toner (Ty, Tm, and Tc) of the present embodiment, known image toners can be used. Among them, an image toner using a thermoplastic resin as a binder resin is preferable. The thermoplastic resin is not particularly limited, and resins used hitherto for image toners, such as a polyester resin, a vinyl resin, an acrylic resin, and a styrene acrylic resin can be used. The image toner may contain a plurality of such resins. Among them, it is more preferable to use an image toner using the styrene acrylic resin. The image toner may contain a colorant, a magnetic material, a charge control agent, a wax, an external additive, and the like.

Example of Image Toner Producing Method

An example of an image toner producing method used in the present example is as follows.

Styrene 60.0 parts

Colorant 6.5 parts (C.I. Pigment Blue 15:3, manufactured by Dainichiseika Color & Chemicals Mfg. Co., Ltd.)

The above materials were put into an attritor (manufactured by Mitsui Miike Chemical Engineering Machinery, Co., Ltd.), and further dispersed at 220 rpm for 5 hours using zirconia particles having a diameter of 1.7 mm to obtain a pigment dispersion.

Styrene 15.0 parts n-Butyl acrylate 25.0 parts

Polyester resin 4.0 parts (A Polyester Resin Having a Weight Average Molecular Weight (Mw) of 20,000, a Glass Transition Temperature (Tg) of 75° C., and an Acid Value of 8.2 mgKOH/g)

Behenyl behenate 12.0 parts (An Ester Wax Obtained by Esterifying Behenic Acid and Behenyl Alcohol)

Divinylbenzene 0.5 parts

The above materials were mixed and added to the pigment dispersion. The obtained mixture was kept at 60° C., stirred at 500 rpm using T.K. Homomixer (manufactured by Tokushu Kika Kogyo Co., Ltd.), and uniformly dissolved and dispersed to prepare a polymerizable monomer composition.

On the other hand, 850.0 parts of a 0.10 mol/L-$Na_3PO_4$ aqueous solution and 8.0 parts of 10% hydrochloric acid were added to a vessel equipped with a high-speed stirrer ClearMix (manufactured by M Technique Co., Ltd.), the rotational speed was adjusted to 15000 rpm, and the mixture was heated to 70° C. Here, 127.5 parts of a 1.0 mol/L-$CaCl_2$) aqueous solution was added to prepare an aqueous medium containing a calcium phosphate compound.

After the polymerizable monomer composition was put into the aqueous medium, 7.0 parts of t-butyl peroxypivalate as a polymerization initiator was added, and granulation was performed for 10 minutes while maintaining the rotational speed of 15000 rpm. Thereafter, the stirrer was changed from the high-speed stirrer to a propeller stirring blade, and the mixture was reacted at 70° C. for 5 hours while being refluxed, then the liquid temperature was set to 85° C., and the mixture was further reacted for 2 hours.

After completion of the polymerization reaction, the obtained slurry was cooled, hydrochloric acid was further added to the slurry to adjust the pH to 1.4, and the resulting mixture was stirred for 1 hour to dissolve the calcium phosphate salt. Thereafter, the slurry was washed with three times its amount of water, filtered, dried, and then classified to obtain toner particles.

Thereafter, 2.0 parts of silica fine particles (number average particle diameter of primary particles: 10 nm, and BET specific surface area: 170 $m^2/g$) hydrophobized using dimethyl silicone oil (20 mass %) as an external additive was added to 100.0 parts of the toner particles, and the mixture was mixed at 3000 rpm for 15 minutes using a Mitsui Henschel mixer (manufactured by Mitsui Miike Chemical Engineering Machinery, Co., Ltd.) to obtain a toner. The weight average particle diameter of the obtained toner was 6.5 μm.

Schematic Description of Bonding Toner

As the bonding toner (Tn) of the present embodiment, a toner containing a thermoplastic resin can be used. A resin that can be used as the thermoplastic resin is not particularly limited, and examples thereof include known thermoplastic resins such as a polyester resin, a vinyl resin, an acrylic resin, a styrene acrylic resin, polyethylene, polypropylene, polyolefin, an ethylene-vinyl acetate copolymer resin, and an ethylene-acrylic acid copolymer resin. The bonding toner may contain a plurality of such resins.

The bonding toner Tn preferably further contains a wax. As the wax, known waxes such as an ester wax which is an ester of an alcohol and an acid, and a hydrocarbon wax such as a paraffin wax can be used. The bonding toner Tn may contain a colorant. As the colorant, known colorants such as a black colorant, a yellow colorant, a magenta colorant, and a cyan colorant can be used. The bonding toner Tn serving as a toner for bonding may contain a magnetic material, a charge control agent, a wax, and an external additive.

In order to form a bonding portion using the bonding toner Tn on the sheet P using an electrophotographic system, the weight average particle diameter of the bonding toner Tn is preferably 5.0 μm or more and 30 μm or less, and more preferably 6.0 μm or more and 20 μm or less. In addition, the image toner may be used as the bonding toner Tn as long as adhesion is satisfied.

Example of Bonding Toner Producing Method

An example of a method of producing the bonding toner Tn used in the present embodiment is as follows.

Styrene 75.0 parts n-Butyl acrylate 25.0 parts

Polyester resin 4.0 parts (A polyester resin having a weight average molecular weight (Mw) of 20,000, a glass transition temperature (Tg) of 75° C., and an acid value of 8.2 mgKOH/g)

Ethylene glycol distearate 14.0 parts (An Ester Wax Obtained by Esterifying Ethylene Glycol and Stearic Acid)

Hydrocarbon wax (HNP-9, manufactured by Nippon Seiro Co., Ltd.) 2.0 parts

Divinylbenzene 0.5 parts

The mixture obtained by mixing the above materials was kept at 60° C., stirred at 500 rpm using T.K. Homomixer (manufactured by Tokushu Kika Kogyo Co., Ltd.), and uniformly dissolved to prepare a polymerizable monomer composition.

On the other hand, 850.0 parts of a 0.10 mol/L-$Na_3PO_4$ aqueous solution and 8.0 parts of 10% hydrochloric acid were added to a vessel equipped with a high-speed stirrer ClearMix (manufactured by M Technique Co., Ltd.), the rotational speed was adjusted to 15000 rpm, and the mixture was heated to 70° C. Here, 127.5 parts of a 1.0 mol/L-$CaCl_2$) aqueous solution was added to prepare an aqueous medium containing a calcium phosphate compound.

After the polymerizable monomer composition was put into the aqueous medium, 7.0 parts of t-butyl peroxypivalate as a polymerization initiator was added, and granulation was performed for 10 minutes while maintaining the rotational speed of 15000 rpm. Thereafter, the stirrer was changed from the high-speed stirrer to a propeller stirring blade, and the mixture was reacted at 70° C. for 5 hours while being refluxed, then the liquid temperature was set to 85° C., and the mixture was further reacted for 2 hours.

After completion of the polymerization reaction, the obtained slurry was cooled, hydrochloric acid was further added to the slurry to adjust the pH to 1.4, and the resulting mixture was stirred for 1 hour to dissolve the calcium phosphate salt. Thereafter, the slurry was washed with three times its amount of water, filtered, dried, and then classified to obtain bonding toner particles.

Thereafter, 2.0 parts of silica fine particles (number average particle diameter of primary particles: 10 nm, and BET specific surface area: 170 $m^2/g$) hydrophobized using dimethyl silicone oil (20 mass %) as an external additive was added to 100.0 parts of the bonding toner particles, and the mixture was mixed at 3000 rpm for 15 minutes using a Mitsui Henschel mixer (manufactured by Mitsui Miike Chemical Engineering Machinery, Co., Ltd.) to obtain a bonding toner. The weight average particle diameter of the obtained bonding toner was 6.8 μm.

Weight Average Particle Size Measurement Method

The weight average particle diameters of the image toner and the bonding toner Tn were calculated as follows. As a measurement device, a precision particle size distribution measurement device using resistive pulse sensing with a 100 μm aperture tube, "Multisizer 3 Coulter counter" (registered trademark, manufactured by Beckman Coulter, Inc.), was used. For setting of measurement conditions and analysis of measurement data, the attached dedicated software "Beckman Coulter Multisizer 3 Version 3.51" (manufactured by Beckman Coulter, Inc.) was used. The measurement was performed with 25,000 effective measurement channels.

As the electrolytic aqueous solution used for the measurement, an electrolytic aqueous solution in which special grade sodium chloride was dissolved in ion-exchanged water so as to have a concentration of 1% by mass, for example, "ISOTON IT" (manufactured by Beckman Coulter, Inc.), was used.

Before the measurement and analysis, the dedicated software was set as follows. On the "change of standard measurement method (SOM)" screen of the dedicated software, the total count number of a control mode was set to 50,000 particles, the number of measurements was set to 1, and a value obtained by using "standard particles of 10.0 μm" (manufactured by Beckman Coulter, Inc.) was set as a Kd value. A threshold and a noise level were automatically set by pressing a "threshold/noise level measurement button". In addition, a current was set to 1600 μA, a gain was set to 2, an electrolytic solution was set to ISOTON II, and a check box for "flash aperture tube after measurement" was ticked. On the "setting for conversion from pulse to particle diameter" screen of the dedicated software, a bin interval was set to a logarithmic particle diameter, a particle diameter bin was set to 256 particle diameter bins, and a particle diameter range was set to 2 μm to 60 μm.

A specific measurement method is as follows.

(1) 200 mL of an electrolytic aqueous solution was put into a 250 mL round-bottom beaker made of glass and dedicated for the Multisizer 3, the beaker was set in a sample stand, and stirring with a stirrer rod was performed counterclockwise at 24 revolutions/second. Then, dirt and bubbles in the aperture tube were removed by the "flash aperture tube" function of the dedicated software.

(2) 30 mL of an electrolytic aqueous solution was input into a 100 mL flat bottom beaker made of glass. Then, 0.3 mL of a diluent obtained by diluting "Contaminon N" (a 10 mass % aqueous solution of a neutral detergent for washing precision measuring instruments, including a nonionic surfactant, an anionic surfactant, and an organic builder, and having a pH of 7, which is manufactured by Wako Pure Chemical Industries, Ltd.) with three times its mass of ion-exchanged water was added as a dispersant to the beaker.

(3) An ultrasonic disperser "Ultrasonic Dispersion System Tetora 150" (manufactured by Nikkaki Bios Co., Ltd.) incorporating two oscillators having an oscillation frequency of 50 kHz with phases shifted by 180 degrees and having an electrical output of 120 W was prepared. 3.3 L of ion-exchanged water was put into a water tank of the ultrasonic disperser, and 2 mL of Contaminon N was added to the water tank.

(4) The beaker of (2) was set in a beaker fixing hole of the ultrasonic disperser, and the ultrasonic disperser was operated. Then, the height position of the beaker was adjusted so that the resonance state of the liquid level of the electrolytic aqueous solution in the beaker is maximized.

(5) In a state in which the electrolytic aqueous solution in the beaker of (4) is irradiated with ultrasonic waves, the toner or the bonding toner was added to the electrolytic aqueous solution little by little so as to be 10 mg, and dispersed. Then, the ultrasonic dispersion treatment was continued for additional 60 seconds. Upon the ultrasonic dispersion, the water temperature of the water tank was appropriately adjusted to 10° C. or higher and 40° C. or lower.

(6) The electrolytic aqueous solution of (5) in which the toner or the bonding toner was dispersed was added dropwise using a pipette to the round-bottom beaker of (1) set in the sample stand, and the concentration of the toner or the bonding toner to be measured was adjusted to be 5%. Then, the measurement was performed until 50,000 particles are measured.

(7) The measurement data was analyzed with the dedicated software attached to the device to calculate the weight average particle diameter.

Image Forming Operation

Next, an image forming operation of the printer unit 1 will be described (see FIG. 1). The image forming operation is a series of operations in which the printer unit 1 creates the toner image with then image toner on the sheet P while conveying the sheets P one by one and applies the bonding toner to a predetermined bonding region on the sheet P. When a print instruction accompanied with image data to be printed is input to the image forming apparatus 1S, the control unit of the image forming apparatus 1S starts the image forming operation.

When the image forming operation is started, the sheets P stored in the cassette 8 are fed one by one from the cassette 8 by a feeding roller 8*a*. The printer unit 1 can also feed the sheets P set in a multi-tray 20 (a manual feed tray or multi-purpose tray) one by one. The fed sheet P is conveyed toward the transfer nip 5*n* by a conveyance roller pair 8*b*.

In parallel with the feeding of the sheet P, in the image forming unit 1*e*, the process cartridges 7*n*, 7*y*, 7*m*, and 7*c* are sequentially driven, and the photosensitive drums Dn, Dy, Dm, and Dc are rotationally driven. The surfaces of the photosensitive drums Dn, Dy, Dm, and Dc are uniformly charged by the charging rollers Cn, Cy, Cm, and Cc. In addition, the scanner unit 2 irradiates the photosensitive drums Dn, Dy, Dm, and Dc with laser light modulated based on the image data, thereby forming electrostatic latent images on the surfaces of the photosensitive drums Dn, Dy, Dm, and Dc.

The developing rollers Hn, Hy, Hm, and Hc of the process cartridges 7*n*, 7*y*, 7*m*, and 7*c* supply the toner (the image toner or the bonding toner) serving as a developer to the photosensitive drums Dn, Dy, Dm, and Dc, thereby developing the electrostatic latent images into the toner images. The bonding toner image formed on the photosensitive drum Dn by the bonding toner Tn is different from the toner image (normal toner image) of the image toner for printing an image such as a text or a figure on the sheet Pin that it is not intended to deliver visual information. However, in the following description, in order to form the bonding toner image in a predetermined pattern on the sheet P, a bonding toner image developed by an electrophotographic process (a bonding layer formed by the bonding toner Tn) is also treated as one of "toner images".

The toner images created in the process cartridges 7*n*, 7*y*, 7*m*, and 7*c* are transferred (primarily transferred) from the photosensitive drums to the transfer belt 3*a* by an electric field formed between the photosensitive drums Dn, Dy, Dm, and Dc and the primary transfer rollers Fn, Fy, Fm, and Fc. The toner image borne on the transfer belt 3*a* and having reached the transfer nip 5*n* is transferred (secondarily transferred) to the sheet P fed and conveyed from the cassette 8 by an electric field formed between the secondary transfer roller 5 and the secondary transfer counter roller 3*b*.

Thereafter, the sheet P is conveyed to the fixing device 6 and subjected to thermal fixing processing. That is, when the sheet P passes through the fixing nip 6*n*, the toner image on the sheet P is heated and pressurized, so that the image toner and the bonding toner are melted and then fixed to the sheet P.

A switching guide 21 is disposed downstream of the fixing nip 6*n* in the sheet conveyance direction. The switching guide 21 is a guide member for switching a conveyance path of the sheet P based on single-sided/duplex setting designated by the print instruction.

In a single-sided mode (single-sided printing) in which a toner image is formed only on one side of the sheet P, the switching guide 21 guides the sheet P toward a discharge roller pair 22. In a duplex mode (duplex printing) in which images are formed on both sides of the sheet P, the switching guide 21 guides the sheet P on which toner images are formed on the surfaces toward a reverse conveyance roller pair 23 (a switchback roller pair). The reverse conveyance roller pair 23 performs switchback of conveying the sheet Pin a second direction opposite to the first direction after conveying the sheet P in the first direction and before a trailing edge of the sheet passes through a nip portion of the reverse conveyance roller pair 23. The sheet P switched back by the reverse conveyance roller pair 23 is conveyed via a duplex conveyance path 27, and passes through the transfer nip 5*n* and the fixing nip 6*n* again to form a toner image on the back surface. The sheet P on which the toner image is formed on the back surface is guided toward the discharge roller pair 22 by the switching guide 21.

The discharge roller pair 22 discharges the sheet P to the outside of the printer unit 1. As a result, the image forming operation for one sheet P is completed. In the present embodiment, the sheet P discharged from the discharge roller pair 22 is received by the intermediate conveyance unit 26. The intermediate conveyance unit 26 conveys the sheet P toward the post-processing device 4 by conveyance roller pairs 24 and 25.

Furthermore, the casing 19 of the printer unit 1 is provided with an operation panel 81, and the operation panel 81 includes a liquid crystal display unit 82 that can be viewed and touched by a user. An operation status of the printer unit 1 and a status of consumables such as the toner are displayed on the liquid crystal display unit 82 by the control unit. In addition, the liquid crystal display unit 82 has a navigation function of guiding the user to a specific operation.

Post-Processing Device

As illustrated in FIG. 1, the post-processing device 4 of the present embodiment has a floor standing type configuration. That is, the post-processing device 4 is installed on an installation surface on which the printer unit 1 is installed, and is arranged side by side with the printer unit 1 in a horizontal direction.

The post-processing device 4 includes a conveyance path for conveying the sheet P received from the outside, a plurality of conveyance roller pairs arranged along the conveyance path, an inlet sensor 30*a*, the booklet making device 50 for making a booklet by bonding a plurality of sheets P, an upper discharge tray 33, and a lower discharge tray 34.

In the present embodiment, the plurality of conveyance roller pairs are an inlet roller pair 30, a first roller pair 31, a reverse discharge roller pair 32, a second roller pair 36, a third roller pair 37, an inner discharge roller pair 38, and a booklet discharge roller pair 39. The inlet roller pair 30, the first roller pair 31, and the reverse discharge roller pair 32 are disposed on a first conveyance path from a receiving port for receiving the sheet P from the outside toward the upper discharge tray 33. The second roller pair 36, the third roller pair 37, and the inner discharge roller pair 38 are arranged on a second conveyance path from the reverse discharge roller pair 32 toward the booklet making device 50. The booklet discharge roller pair 39 is arranged on a third conveyance path from the booklet making device 50 toward the lower discharge tray 34.

The upper discharge tray 33 is a stacking portion on which the sheets P not subjected to the processing in the booklet making device 50 are stacked. The lower discharge tray 34 is a stacking portion on which the booklet processed by the booklet making device 50 is stacked. The reverse discharge roller pair 32 is a discharge portion that discharges the sheet P to the upper discharge tray 33. The reverse discharge roller pair 32 is a reversing portion that switches back the sheet P conveyed on the first conveyance path and sends the sheet P to the second conveyance path. The booklet discharge roller pair 39 is a discharge portion that discharges the booklet conveyed on the third conveyance path. A casing of the post-processing device 4 is provided with a discharge port through which the sheet P is discharged toward the upper discharge tray 33 and a booklet discharge port 40 through which the booklet is discharged toward the lower discharge tray 34.

The post-processing device 4 includes a control unit 90. The control unit 90 includes a central processing unit (CPU) 91, a read only memory (ROM) 92, and a random access memory (RAM) 93. The ROM 92 stores various programs, and the CPU 91 reads the programs from the ROM 92 and executes the programs. The RAM 93 is used as a work area of the CPU 91.

An operation of the post-processing device 4 will be described. The sheet P conveyed from the intermediate conveyance unit 26 is conveyed to the reverse discharge roller pair 32 via the inlet roller pair 30 and the first roller pair 31. The first roller pair 31 increases a rotational speed and accelerates the sheet P when the inlet sensor **30*a* detects the trailing edge of the sheet P. When it is set in the print instruction not to perform processing of bonding the sheets P (not to produce a booklet), the sheet P is discharged as it is by the reverse discharge roller pair 32 and stacked on the upper discharge tray 33. At this time, when the trailing edge of the sheet P reaches between the first roller pair 31 and the reverse discharge roller pair 32, a conveyance speed of the sheet P is decreased to a predetermined discharge speed, and the sheet P is discharged toward the upper discharge tray 33**.

When it is set in the print instruction to perform the processing of bonding the sheets P (to produce a booklet), the sheet P is switched back by the reverse discharge roller pair 32. That is, the reverse discharge roller pair 32 conveys the sheet P in the first direction (discharge direction), and when the trailing edge of the sheet Pin the first direction passes through a reverse flap 35, the reverse discharge roller pair 32 reverses the sheet conveyance direction to the second direction opposite to the first direction, and sends the sheet P to the second conveyance path. The sheet P passes through the second roller pair 36 and the third roller pair 37, and is discharged to the booklet making device 50 by the inner discharge roller pair 38.

The booklet making device 50 serving as a booklet forming device makes a booklet by bonding a plurality of sheets P with the bonding toner. Details of the booklet making device 50 are described below. The booklet discharge roller pair 39 discharges the booklet conveyed from the booklet making device 50 to the outside of the post-processing device 4 through the booklet discharge port 40. The discharged booklet is stacked on the lower discharge tray 34.

Booklet Making Device

Next, the booklet making device 50 will be described. As illustrated in FIG. 1, the booklet making device 50 includes an intermediate stacking portion 51 serving as a sheet support portion that supports a sheet bundle to be processed, an alignment mechanism that aligns the stacked sheet bundle, and a thermocompression bonding unit 60 that thermocompression-bonds the sheet bundle.

The alignment mechanism aligns the sheet conveyed to the intermediate stacking portion 51 at a position for performing thermocompression bonding (bonding operation) of the thermocompression bonding unit 60. A method of aligning the sheet bundle by the alignment mechanism will be described with reference to FIGS. 2A to 3B. FIGS. 2A to 3B illustrate a state in which the booklet making device 50 is viewed from a direction (height direction) perpendicular to a sheet stacking surface of the intermediate stacking portion 51. In the following description, a direction along the sheet stacking surface and in which the sheet P is conveyed toward the intermediate stacking portion 51 is referred to as a "longitudinal direction" or an "X direction", and a direction along the sheet stacking surface and orthogonal to the longitudinal direction (X direction) is referred to as a "lateral direction" or a "Y direction".

Figure 2A:
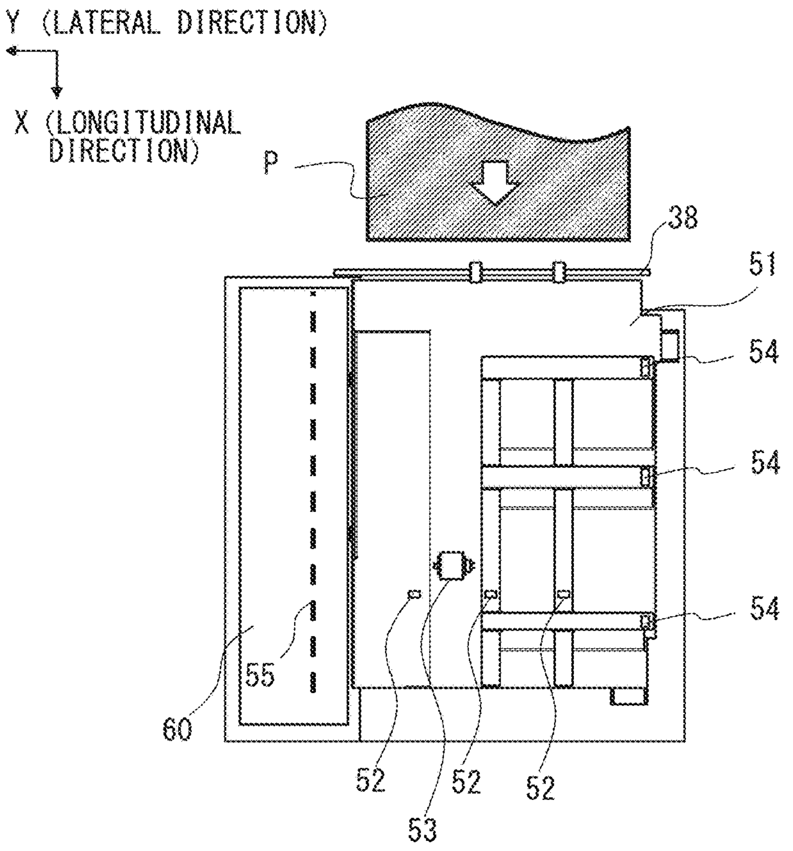
FIG. 2A is a view illustrating a state in which a sheet is conveyed to an intermediate stacking portion.

As illustrated in FIG. 2A, the alignment mechanism includes a longitudinal alignment reference plate 52, a longitudinal alignment roller 53, a lateral alignment reference plate 55, and a lateral alignment claw 54. The longitudinal alignment reference plate 52 serves as a reference of a sheet position in the longitudinal direction. The lateral alignment reference plate 55 serves as a reference of a sheet position in the lateral direction. The longitudinal alignment roller 53 is an example of a first movement member that moves the sheet P toward the longitudinal alignment reference plate 52, and is a semicircular roller in which a part of an outer peripheral surface is formed in a linear shape in the present embodiment. By configuring the longitudinal alignment roller 53 as a semicircular roller in this manner, even in a case where the longitudinal alignment roller 53 rotates in a state where the sheet P abuts against the longitudinal alignment reference plate 52, it is possible to suppress formation of wrinkles and folds on the sheet P. The lateral alignment claw 54 is an example of a second movement member that moves the sheet P toward the lateral alignment reference plate 55.

Figure 2B:
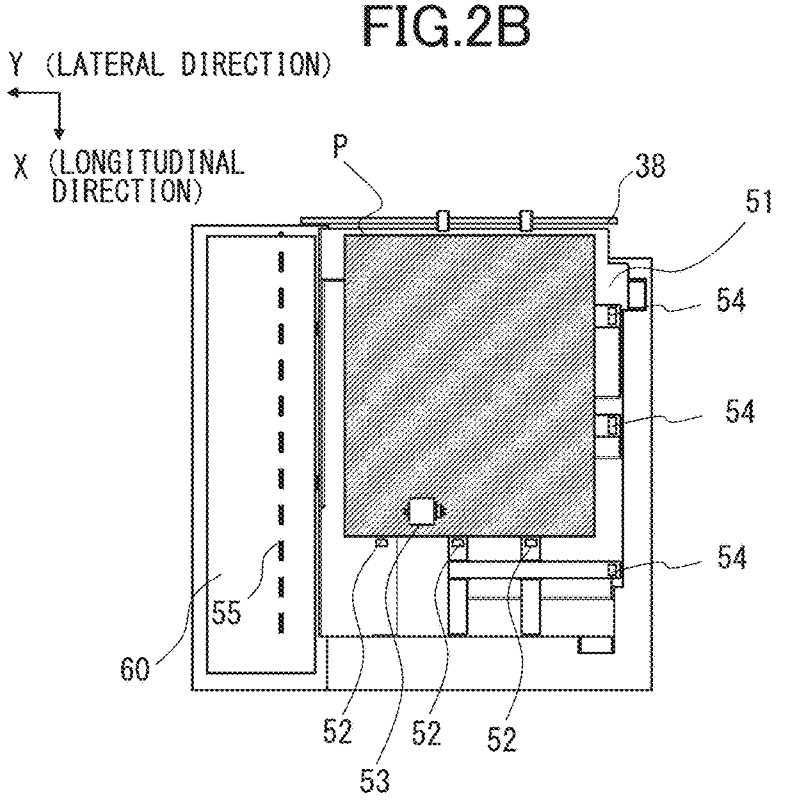
FIG. 2B is a view illustrating a state in which the sheet abuts against a longitudinal alignment reference plate.

As illustrated in FIG. 2A, the sheet P conveyed to the inner discharge roller pair 38 is discharged to the intermediate stacking portion 51 by the inner discharge roller pair 38. As illustrated in FIG. 2B, when the trailing edge of the sheet P in the longitudinal direction passes through the inner discharge roller pair 38, the longitudinal alignment roller 53 moves the sheet P in the longitudinal direction, and an end portion of the sheet P in the longitudinal direction abuts against the longitudinal alignment reference plate 52. Accordingly, the position of the sheet P in the longitudinal direction is aligned. As illustrated in FIG. 1, a bundle pressing member 45 is rotatably supported in the vicinity of the inner discharge roller pair 38, and the bundle pressing member 45 presses the trailing edge of the sheet P stacked on the intermediate stacking portion 51 against the intermediate stacking portion 51. As a result, it is possible to suppress interference between the trailing edge of the preceding sheet stacked on the intermediate stacking portion 51 and the leading edge of the succeeding sheet discharged toward the intermediate stacking portion 51 by the inner discharge roller pair 38.

Figure 3A:
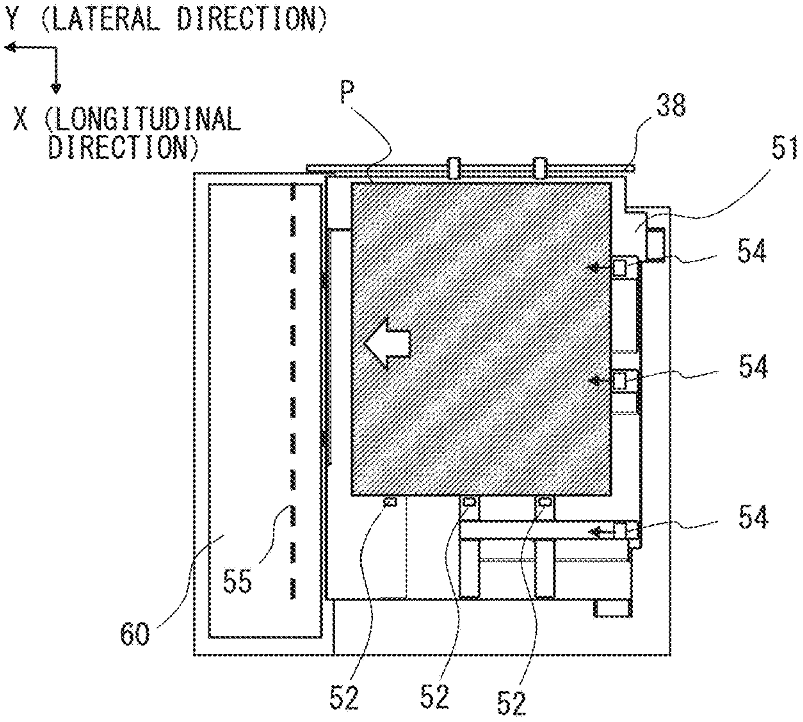
FIG. 3A is a view illustrating a state in which a lateral alignment claw moves.
Figure 3B:
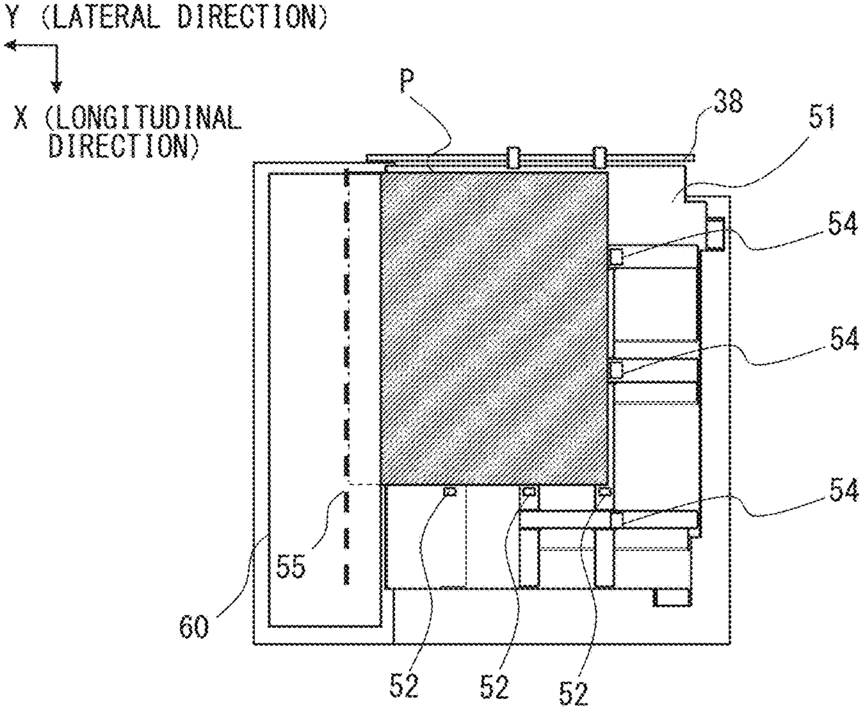
FIG. 3B is a view illustrating a state in which an end portion of the sheet abuts against a lateral alignment reference plate.

Subsequently, as illustrated in FIG. 3A, the lateral alignment claw 54 comes into contact with a first end portion of the sheet Pin the lateral direction, and move the sheet P toward the lateral alignment reference plate 55. As illustrated in FIG. 3B, a second end portion of the sheet P in the lateral direction abuts against the lateral alignment reference plate 55. Accordingly, the position of the sheet P in the lateral direction is aligned.

The booklet making device 50 aligns each sheet P of the sheet bundle stacked on the intermediate stacking portion 51 in the longitudinal direction and the lateral direction as described above. The thermocompression bonding unit 60 described next bonds the sheets via the bonding toner by thermocompression-bonding the aligned sheet bundle. After the sheet bundle is aligned in the longitudinal direction and the lateral direction by the alignment mechanism, the sheet bundle is bonded by the thermocompression bonding unit 60 to form a booklet, so that a precisely aligned booklet can be made.

In FIGS. 2A to 3B, a case where the sheets P are conveyed one by one to the booklet making device 50 has been described, but a plurality of sheets P stacked in advance may be conveyed to the booklet making device 50. For example, after the preceding sheet is switched back by the reverse discharge roller pair 32, the preceding sheet is temporarily stopped by the second roller pair 36. Thereafter, the second roller pair 36 conveys the preceding sheet toward the reverse discharge roller pair 32 according to a timing at which the succeeding sheet reaches the reverse discharge roller pair 32. As a result, in the reverse discharge roller pair 32, a sheet bundle in which the preceding sheet and the succeeding sheet are stacked is formed. Further, by replacing the "preceding sheet" with the already stacked preceding sheet bundle and further replacing the "succeeding sheet" with the succeeding sheet, a sheet bundle of three or more sheets can be made. The sheet bundle stacked in advance by the reverse discharge roller pair 32 passes through the second roller pair 36 and the third roller pair 37, and is stacked on the intermediate stacking portion 51 by the inner discharge roller pair 38.

As described above, a mechanism of stacking the succeeding sheets while reciprocating the preceding sheet (bundle) between the reverse discharge roller pair 32 and the second roller pair 36 is an example of a buffer mechanism (stacking unit) that conveys a plurality of sheets in a stacked state toward the intermediate stacking portion 51. Other known mechanisms may be used as the buffer mechanism (stacking unit).

In a case where a plurality of sheets P stacked in advance are conveyed to the booklet making device 50, the alignment mechanism of the booklet making device 50 can perform an alignment operation as follows. When the plurality of sheets P are stacked, the sheets P are offset in advance such that the lower sheet P protrudes downstream in the longitudinal direction (toward a side closer to the longitudinal alignment reference plate 52) of the upper sheet P on the intermediate stacking portion 51. When the trailing edge of the lowermost sheet P passes through the inner discharge roller pair 38, the longitudinal alignment roller 53 move the lowermost sheet Pin the longitudinal direction to abut against the longitudinal alignment reference plate 52. Similarly, every time the trailing edge of one upper sheet P passes through the inner discharge roller pair 38, the longitudinal alignment roller 53 move the sheet P in the longitudinal direction to abut against the longitudinal alignment reference plate 52. As a result, the positions of the plurality of sheets P in the longitudinal direction are aligned. After the positions of the plurality of sheets P in the longitudinal direction are aligned, the lateral alignment claw 54 moves the plurality of sheets P toward the lateral alignment reference plate 55, and the plurality of sheets P collectively abut against the lateral alignment reference plate 55. As a result, the positions of the plurality of sheets P in the lateral direction are aligned.

Thermocompression Bonding Unit

Figure 4:
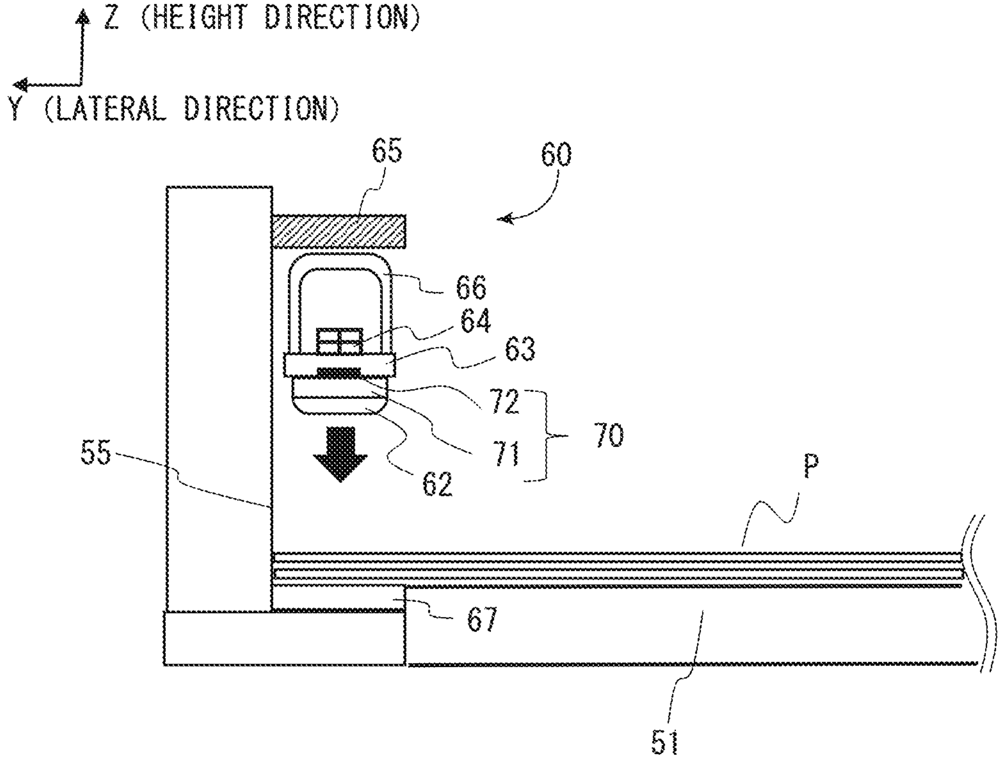
FIG. 4 is a cross-sectional view illustrating a thermocompression bonding unit.

The thermocompression bonding unit 60 of the booklet making device 50 will be described. FIG. 4 is a cross-sectional view of thermocompression bonding unit 60 taken along a plane perpendicular to the longitudinal direction (X direction). In a description of the booklet making device 50, a direction perpendicular to the sheet stacking surface of the intermediate stacking portion 51 (a direction orthogonal to both the X direction and the Y direction) is referred to as a "height direction" or a "Z direction". In the description of the booklet making device 50, unless otherwise specified, "downward" represents a downward direction in the height direction (Z direction), and "upward" represents an upward direction in the height direction (Z direction).

The thermocompression bonding unit 60 is an example of a bonding unit that bonds sheets to each other. The thermocompression bonding unit 60 includes a pressurizing plate 62, a receiving plate 67, a heater 70, a heater support 63, a metal stay 66, and a pressurizing lever 65. The pressurizing plate 62 is an example of a pressurizing member (first pressurizing member and heating pressurizing member) that pressurizes the sheet P. The metal stay 66 transmits a pressurizing force from the pressurizing lever 65 to the pressurizing plate 62 via the heater support 63 and the heater 70. The receiving plate 67 is an example of a receiving member (second pressurizing member) that receives a pressurizing force of the pressurizing plate 62 and pressurizes the sheet P together with the pressurizing plate 62. The heater 70 is an example of a heat source that heats the pressurizing plate 62.

As the heater 70, a ceramic heater in which a resistance heating element 72 is formed on a ceramic substrate 71 can be used. The substrate 71 has, for example, a plate shape with a thickness of 1.0 mm. The pressurizing plate 62 is in contact with a lower surface (a lower surface in the drawing) of the heater 70. The pressurizing plate 62 is, for example, a plate-like member formed of aluminum and having a thickness of 1.5 mm. Power consumption of the thermocompression bonding unit 60 can be reduced by reducing thermal capacities of the heater 70 and the pressurizing plate 62 in this manner. The substrate 71 of the heater 70 may be formed of a material having a high stiffness such as metal other than ceramic.

The pressurizing plate 62 is suitably formed of a material having a small thermal capacity and high thermal conductivity in order to efficiently transfer heat from the heat source to the sheet P. The heater 70 generates heat by energizing the resistance heating element 72. The control unit 90 provided in the post-processing device 4 controls power to be input to the resistance heating element 72 based on a temperature detected by a thermistor 64 serving as a temperature detection unit, so that the pressurizing plate 62 has a predetermined target temperature suitable for thermocompression bonding of the sheets P. The thermistor 64 of the present embodiment is supported by the heater support 63 and is in contact with an upper surface of the heater 70 (a surface opposite to a surface of the heater 70 that faces the pressurizing plate 62).

The heater support 63 supports the heater 70. The heater support 63 is formed of a material such as a liquid crystal polymer which is one of high heat-resistant functional resins. The heater support 63 is supported by the metal stay 66. The pressurizing plate 62, the heater 70, the heater support 63, and the metal stay 66 are a moving unit (heater unit) that reciprocates in the Z direction so as to approach and separate from the receiving plate 67. The metal stay 66 is a reinforcing member (stiff member) that increases the stiffness of the moving unit.

The pressurizing lever 65 is fastened to the metal stay 66 and reciprocates in the Z direction by a driving force of a driving source (not illustrated). When the pressurizing lever 65 moves the moving unit downward, the pressurizing plate 62 comes into contact with the uppermost sheet of the sheet bundle on the receiving plate 67. A range of pressurization of a sheet bundle by the pressurizing plate 62 is, for example, 300 mm in the X direction (longitudinal direction) and 4.0 mm in the Y direction (lateral direction). When the pressurizing lever 65 moves the moving unit upward, the pressurizing plate 62 is separated (retracted) from the sheet bundle on the receiving plate 67.

The receiving plate 67 is a plate-like member formed of silicone rubber and having a thickness of, for example, 2.0 mm, and is supported by a frame body of the booklet making device 50 (a frame body of the post-processing device 4). The receiving plate 67 serves to apply a stable pressurizing force to the sheet bundle by receiving the sheet bundle pressed by the pressurizing lever 65. Further, the pressurizing force applied to the sheet bundle by the pressurizing plate 62 can be controlled by a pressing amount of the pressurizing lever 65 against the moving unit.

The material of the receiving plate 67 is not limited to silicone rubber. The material of the receiving plate 67 preferably has a certain degree of deformability, is resistant to repeated stress, and has heat resistance in order to stably transmit the pressurizing force to the sheet bundle.

The thermocompression bonding unit 60 performs a thermocompression bonding operation (bonding operation) of pressurizing and heating the sheet bundle with the pressurizing plate 62. Specifically, in the thermocompression bonding operation, after the pressurizing plate 62 heated to a target temperature in advance is brought into pressure contact with the sheet bundle for a predetermined time (for example, 2.0 seconds), the pressurizing plate 62 is separated from the sheet bundle. The sheet bundle is pressurized by being sandwiched between the pressurizing plate 62 and the receiving plate 67, and the sheet bundle is heated by the pressurizing plate 62 heated by the heat of the heater 70. By the thermocompression bonding operation, the bonding toner applied in advance by the printer unit 1 is softened, so that the bonding toner serving as the toner for bonding is melted to form a bonding layer S (see FIG. 5B), and the sheets are bonded to each other by the bonding layer S. Hereinafter, the bonding toner Tn heated and melted by the pressurizing plate 62 and then cooled is referred to as the bonding layer S (adhesive). In the present embodiment, the amount of the bonding toner Tn applied to the sheet P is about 0.9 mg/cm$^2$, and the specific gravity of the bonding toner Tn is about 1.0 g/cm$^3$.

The booklet making device 50 of the present embodiment makes a booklet as a product including more than a predetermined number of sheets by performing one thermocompression bonding operation by the thermocompression bonding unit 60 every time the predetermined number of sheets P are stacked. That is, the thermocompression bonding unit 60 performs the next thermocompression bonding operation in a state where the succeeding sheet is stacked on the bonded sheet bundle bonded in the previous thermocompression bonding operation, thereby bonding a surface (first surface) of the uppermost sheet of the bonded sheet bundle and a surface (second surface) of the succeeding sheet facing the first surface. Accordingly, the thermocompression bonding unit 60 can make a booklet of which the number of sheets is larger than the number of sheets that can be bonded by one thermocompression bonding operation. In other words, after heating and pressurizing a first sheet bundle, the pressurizing plate 62 heats and pressurizes a second sheet bundle placed on the first sheet bundle, thereby bonding the first sheet bundle and the second sheet bundle to form one booklet.

The number of sheets P (predetermined number) to be thermocompression-bonded by the thermocompression bonding unit 60 in one thermocompression bonding operation can be appropriately changed in consideration of a time required for a thermocompression bonding process and productivity of booklet making. The thermocompression bonding unit 60 may be configured to perform one thermocompression bonding operation each time one succeeding sheet is stacked on the bonded sheet bundle. In the following description, it is assumed that the thermocompression bonding unit 60 performs one thermocompression bonding operation each time five sheets P are stacked on the intermediate stacking portion 51.

For example, a booklet including 15 sheets P is made by the following process.

The first thermocompression bonding operation is performed when the first to fifth sheets P are stacked on the intermediate stacking portion 51 and aligned by the alignment mechanism. By the first thermocompression bonding operation, a bonded sheet bundle (hereinafter, referred to as a temporary 5-sheet booklet) including five sheets P is made.

The second thermocompression bonding operation is performed when the sixth to tenth sheets P are stacked on the temporary 5-sheet booklet and aligned by the alignment mechanism. By the second thermocompression bonding operation, a bonded sheet bundle (hereinafter, referred to as a temporary 10-sheet booklet) including 10 sheets P is made.

The third thermocompression bonding operation is performed at a stage where the eleventh to fifteenth sheets P are stacked on the temporary 10-sheet booklet and aligned by the alignment mechanism. By the third thermocompression bonding operation, a bonded sheet bundle (hereinafter, referred to as a temporary 15-sheet booklet) including 15 sheets P is made. Through the above three thermocompression bonding operations, a booklet including 15 sheets P is completed as a product.

When a number of sheets P stacked in advance by the buffer mechanism (stacking unit) are conveyed to the booklet making device 50, the number of sheets P stacked by the buffer mechanism (stacking unit) is the same as the number of sheets P thermocompression-bonded by the thermocompression bonding unit 60 in one thermocompression bonding operation. As a result, it is possible to shorten a time required to complete alignment of a predetermined number of sheets P as compared with a case where the booklet making device 50 aligns the predetermined number of sheets P conveyed one by one, and thus an interval of the thermocompression bonding operation may be shortened. Then, the productivity of the post-processing device 4 as a whole can be improved.

When the number of sheets included in one booklet is less than a predetermined number, the thermocompression bonding operation may be performed at a stage where all the sheets P included in one booklet are stacked on the intermediate stacking portion 51 and aligned by the alignment mechanism.

A booklet made by the thermocompression bonding operation of the thermocompression bonding unit 60 is pushed out toward the booklet discharge port 40 (FIG. 1) by a booklet discharge guide included in the booklet making device 50. The booklet discharge guide stops after a leading edge of the booklet reaches the booklet discharge roller pair 39 and returns to a standby position. The booklet discharge roller pair 39 receiving the booklet from the booklet discharge guide discharges the booklet from the post-processing device 4 to the lower discharge tray 34. In this way, a series of booklet making operations for making one booklet ends.

Mechanism of Occurrence of Depression

Figure 5A:
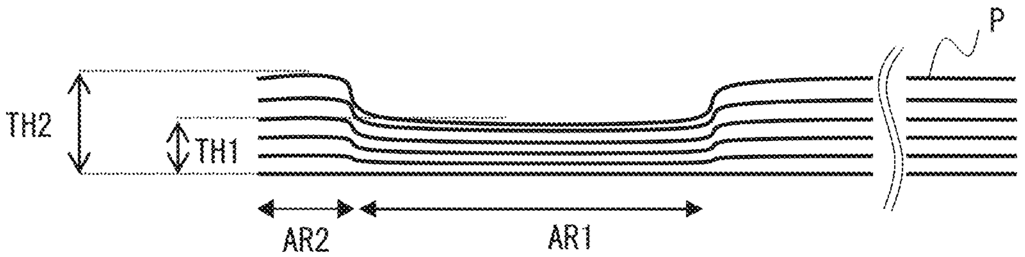
FIG. 5A is a schematic view illustrating a cross section of a booklet in Comparative Example 1.

Next, a mechanism of occurrence of a depression will be described with reference to FIGS. 5A and 5B. FIG. 5A is a schematic view illustrating a booklet cross section in a state where a booklet making operation is completed according to Comparative Example 1. As the number of sheets of the booklet illustrated in FIG. 5B, a relatively large number with which a depression is likely to occur is assumed.

The depression occurs in a region where the bonding toner Tn is applied. More specifically, the depression refers to a state in which a recess is formed in a thickness direction of the sheet P in a region where the bonding toner Tn is applied, which impairs the appearance, as compared with a region where the bonding toner Tn is not applied. In the region where the bonding toner Tn is applied, heating and pressurization are performed by the thermocompression bonding unit 60 as described above. Since the bonding toner Tn has thermoplasticity, the bonding toner Tn is melted by heat received from the thermocompression bonding unit 60. Further, due to a pressure received from the thermocompression bonding unit 60, the bonding toner Tn in a molten state melts and spreads, and a part of the bonding toner Tn tends to penetrate into fine irregularities on the surface of the sheet P.

Due to the action, a force for restraining the sheets P is increased, and as a result, a distance between the sheets P becomes short. Then, the thickness of the bonding layer S formed by the bonding toner Tn tends to be smaller than a distance between the sheets P in the thickness direction when the sheets P are normally stacked. By the action, a thickness TH1 of a booklet in an application region AR1 where the bonding toner Tn is applied tends to be smaller than a thickness TH2 of the booklet in a non-application region AR2 where the bonding toner Tn is not applied. Then, when the difference in thickness increases, the increased difference manifests as the depression. Incidentally, it has been found out by the examination of the inventors that such a depression is likely to occur when the number of sheets P forming a booklet (hereinafter, also referred to as the number sheet of a booklet) is large and when a heating/pressurizing effect by the thermocompression bonding unit 60 is large as conditions under which the depression is likely to occur. A case where the heating/pressurizing effect by the thermocompression bonding unit 60 is large may be a case where the pressurizing force is large, a case where the heating temperature is high, and a case where a heating time is long.

Figure 5B:
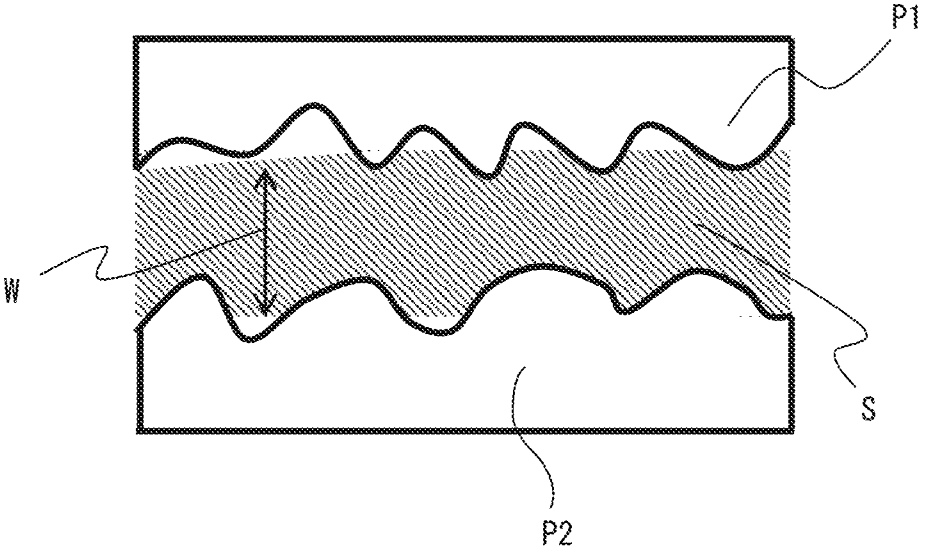
FIG. 5B is an enlarged cross-sectional view illustrating a bonding layer.

FIG. 5B is an enlarged cross-sectional view illustrating the bonding layer S sandwiched between sheets P1 and P2 after the booklet creating operation is completed. As described above, the surface of the sheet P has a certain uneven shape. Therefore, when the bonding toner Tn is subjected to the thermocompression bonding operation by the thermocompression bonding unit 60, the molten bonding toner Tn enters the recess. The degree of penetration of the bonding toner Tn, that is, the strength of heating and pressurization by the thermocompression bonding unit 60 can be evaluated by a thickness W of the bonding layer S illustrated in FIG. 5B.

Here, the thickness W of the bonding layer S after the thermocompression bonding operation was measured under the following conditions.

Observation device: Field emission scanning electron microscope (S-4800 manufactured by Hitachi High-Technologies Corporation)

Measurement condition: 300× magnification

Measurement method: A booklet subjected to the booklet making processing is cut, and the bonding layer S is exposed. Thereafter, the thickness W of the bonding layer S is measured in the thickness direction of the sheet P.

Averaging method: 20 points were measured and a simple average was calculated.

Measurement position: The bonding layer S that was most adjacent to the heating plate 502 at the time of the last thermocompression bonding operation, which tended to have the highest correlation with the depression, was measured. That is, the measured bonding layer S is formed between the uppermost sheet (P1) among the plurality of sheets forming the booklet and the sheet (P2) that is in contact with the uppermost sheet (P1) and disposed under the uppermost sheet (P1). In other words, the measured bonding layer S is the bonding layer S positioned closest to the pressurizing plate 62 in the booklet.

Booklet making condition: Red Label Presentation (manufactured by Canon, A4 size) was used as the sheet P, and the thickness W of the bonding layer S and a state of occurrence of the depression were confirmed while changing the number of sheets of the booklet and thermocompression bonding operation conditions.

From the viewpoint of the occurrence of the depression, the inventors have found that, for example, in a booklet including 30 sheets P, the number of which is relatively large, the thickness W of the bonding layer S is desirably about 8 μm or more, and more desirably about 10 μm or more. On the other hand, in a case where the thickness of the bonding layer S is about 5 μm or less, it has been found that when a booklet including about 30 or more sheets is created, a depression occurs. For example, from the viewpoint of suppressing the occurrence of a depression, when the number of sheets P forming a booklet is 30, the thickness W of the bonding layer S is preferably 6 μm or more and 20 μm or less.

Bonding Strength Test

Figure 6A:
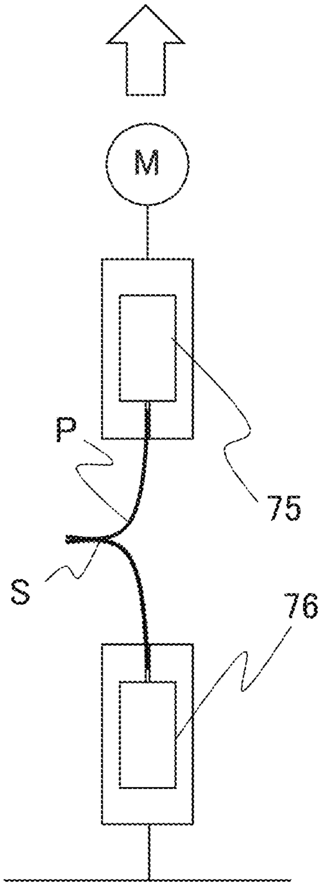
FIG. 6A is a view illustrating a state of measuring a bonding strength in a booklet made by performing thermocompression bonding processing on two sheets.
Figure 6B:
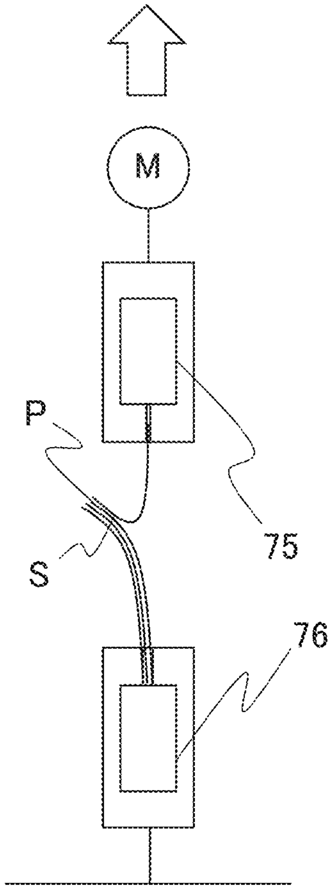
FIG. 6B is a view illustrating a state of measuring a bonding strength in a booklet made by performing the thermocompression bonding processing on four sheets.

Next, a method for evaluating the bonding strength of the bonding layer S will be described with reference to FIGS. 6A and 6B. FIG. 6A is a view illustrating a state of measuring the bonding strength in a booklet made by performing thermocompression bonding processing on two sheets P. FIG. 6B is a view illustrating a state of measuring the bonding strength in a booklet made by performing the thermocompression bonding processing on four sheets P.

As a method for evaluating the bonding strength, first, the booklet after the thermocompression bonding operation is cut to a width of 20 mm to prepare a test piece. Next, the sheet P closest to the pressurizing plate 62 in the test piece was held by a holding member 75 disposed above the booklet. Further, all the remaining sheets P of the booklet were held by a holding member 76 disposed below the booklet. That is, the holding member 76 holds the second sheet P in the example of FIG. 6A, and holds all the second to fourth sheets P in the example of FIG. 6B. A digital force gauge M (FGP-2, manufactured by NIPPON DENSO Corporation) is connected to the holding member 75. The digital force gauge was gradually pulled upward, and a measurement value of the digital force gauge when the bonding portion of the bonding layer S was fallen off was measured. The measurement was performed five times, and the average value was taken as the bonding strength of the bonding layer S.

Figure 7:
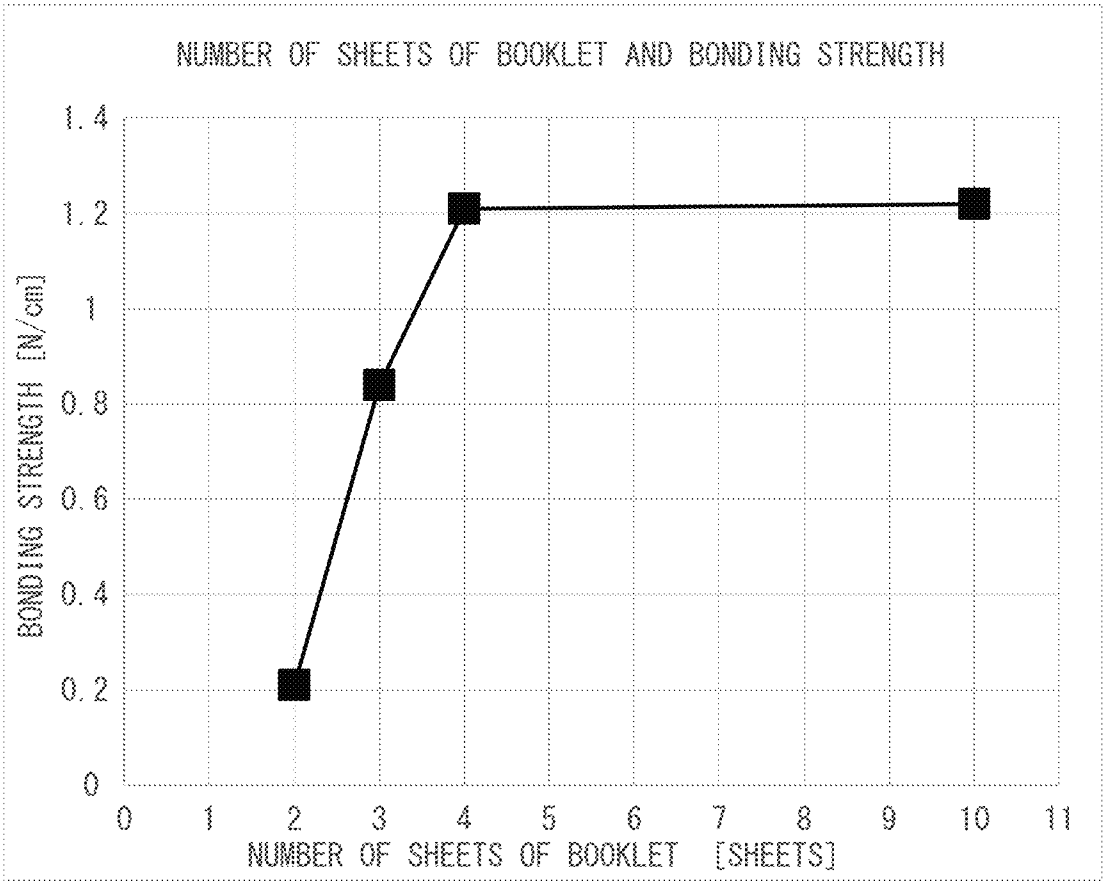
FIG. 7 is a graph illustrating bonding strength test results.

FIG. 7 illustrates results of the bonding strength test when the number of sheets of the booklet was changed. Specifically, the number of sheets of the booklet was two, three, four, and 10. The conditions of the thermocompression bonding operation by the thermocompression bonding unit 60 were common as follows. Pressurizing force: Average surface pressure: 0.2 MPa, surface temperature of pressurizing plate 62: 200° C., heating time: 2.0 seconds, sheet P: Red Label Presentation (manufactured by Canon, A4 size). The heating time is a time taken to heat a sheet bundle by the pressurizing plate 62 in the thermocompression bonding operation.

As illustrated in FIG. 7, it has been confirmed that the bonding strength of the bonding layer S tends to be higher as the number of sheets of the booklet increases up to four. In addition, when the number of sheets of the booklet was more than four, a tendency to converge to a substantially constant value was also confirmed.

For example, in a case where the booklet includes a small number of sheets as illustrated in FIG. 6A, a mode of the bonding strength test is a test mode in which a strength measurement element in a direction in which the sheets Pare fallen off perpendicularly to the thickness direction of the sheets P is strong. In this case, in the bonding toner Tn of a thermoplastic resin adopted in the present embodiment, it is known that bonding by the bonding layer S is likely to be detached with a relatively small force. Therefore, it has been found that the bonding strength tends to be low.

On the other hand, for example, in a state where the number of sheets of the booklet is large as illustrated in FIG. 6B, the mode of the bonding strength test is a test mode in which the strength measurement element in a direction of falling off the sheets P in parallel with the thickness direction of the sheet P is strengthened, that is, a test mode in which a strength of the bonding layer S in a shear direction is evaluated. In this case, it is known that the bonding toner Tn of a thermoplastic resin adopted in the present embodiment tends to obtain a relatively high bonding strength. In this tendency, it has been found that under the condition where the number of sheets is larger than four, a change in tensile angle of the sheet P is relatively small, and a change from the mode for evaluating the strength in the shear direction is small even as the test mode, so that the bonding strength tends to converge to a constant value.

In addition, according to the examination of the inventors, it has been confirmed that the bonding strength of the bonding layer S for making a booklet is desirably 0.3 N/cm or more per unit distance in a width direction of the test piece.

From the above, it has been confirmed that even when a booklet is made under the same heating and pressurizing conditions, a higher bonding strength can be secured as the number of sheets of the booklet is larger. In other words, it can be said that the conditions of the thermocompression bonding operation by the thermocompression bonding unit 60 can be changed so as to weaken, that is, decrease the pressurizing force, decrease the heating temperature, and decrease the heating time for a booklet including a large number of sheets in order to secure the bonding strength equivalent to that in a case where the number of sheets of the booklet is small.

Operation Condition and Performance Evaluation of Thermocompression Bonding Unit Next, the performance evaluation on the bonding strength and the depression when the operation condition of the thermocompression bonding unit 60 is changed according to the number of sheets of the booklet will be described. As described above, the depression is likely to occur when the strength of heating and pressurization received by the bonding toner Tn is relatively high, and is likely to occur when the number of sheets of the booklet is large. In addition, the bonding strength of the booklet tends to be higher when the number of sheets of the booklet is larger.

As described above, focusing on the number of sheets of the booklet to be made, a basic idea of the present technology is to reduce the strength of heating/pressurization in a case where the number of sheets of the booklet is large as compared with a case where the number of sheets of the booklet is small, and to suppress the occurrence of a depression while maintaining the bonding strength of the booklet. In the present embodiment, a configuration focusing on a pressure at the time of heating and pressurization will be described as a heating and pressurization condition which is the operation condition of the thermocompression bonding unit 60. The operation condition of thermocompression bonding unit 60 is changed by the control unit 90.

As common conditions for making a booklet, Red Label Presentation (manufactured by Canon, A4 size) was used as the sheet P, and among the conditions of the thermocompression bonding operation by the thermocompression bonding unit 60, the surface temperature of the pressurizing plate 62 was 200° C., and the heating time was 2.0 seconds (constant except for the pressurizing force). Further, when a booklet of which the number of sheets is two and a booklet of which the number of sheets is 30 were made, and when making the booklet of which the number of sheets is 30, heating and pressurization were performed by the thermocompression bonding unit 60 every five sheets as described above. The conditions at the time of each thermocompression bonding operation were as shown in Table 1 described below. That is, for example, in a case of making the booklet of which the number of sheets is 30, six thermocompression bonding operations were executed in total, and the conditions at that time were all the same conditions.

Table 1 shows booklet making conditions (the operation conditions of thermocompression bonding unit 60) and performance evaluation according to the present embodiment. The bonding strength and the thickness W of the bonding layer S were observed for the bonding layer S positioned closest to the pressurizing plate 62 in the booklet. This is because even when the thermocompression bonding operation is performed a plurality of times (for example, the thermocompression bonding operation is performed six times to make a booklet of which the number of sheets is 30) to form one booklet, the bonding layer S positioned closest to the pressurizing plate 62 in the booklet is affected by only the last thermocompression bonding operation regardless of the number of sheets of the booklet. Therefore, it is preferable to consider the thickness of the bonding layer S positioned closest to the pressurizing plate 62 in the booklet as a comparison of the results when the thermocompression bonding operation is performed under different operation conditions.

TABLE 1

| | Number of sheets of booklet | Pressurizing force | Bonding strength | | Depression | |
|---|---|---|---|---|---|---|
| | | | Experiment result | Determination | Thickness of bonding layer | Determination |
| Comparative Example 1 | 2 sheets | 0.4 MPa | 0.80 N/cm | No problem | About 5 μm | No problem |
| | 30 sheets | 0.4 MPa | 1.4 N/cm | No problem | About 5 μm | Occurred |
| First Embodiment | 2 sheets | 0.4 MPa | 0.80 N/cm | No problem | About 5 μm | No problem |
| | 30 sheets | 0.2 MPa | 1.2 N/cm | No problem | About 10 μm | No problem |
| Comparative Example 2 | 2 sheets | 0.2 MPa | 0.21 N/cm | Insufficient | About 10 μm | No problem |

In Comparative Example 1, the thermocompression bonding operation was performed on a sheet bundle at a relatively high pressure of 0.4 MPa in order to increase the bonding strength of the booklet under the condition that the number of sheets of the booklet is two, which is a relatively small number. Therefore, a high bonding strength of 0.80 N/cm was achieved, indicating a sufficient bonding performance. In addition, the thickness W of the bonding layer S was about 5 μm, which may cause a depression. However, since the number of sheets of the booklet was small, the depression did not become apparent, and there was no depression problem.

On the other hand, even under the condition the number of sheets of the booklet is 30, which is a relatively large number, the thermocompression bonding operation was performed on the sheet bundle at 0.4 MP without changing the pressure. Therefore, the bonding strength was as high as 1.4 N/cm, but a depression occurred.

Next, the present embodiment will be described. In this configuration, the thermocompression bonding operation was performed at 0.4 MPa in the same manner as in Comparative Example 1 under the condition that the number of sheets of the booklet is two, which is a relatively small number. Therefore, as for the performance evaluation result, the bonding strength was sufficient, the occurrence of a depression was not observed, and the result was favorable. Under the condition that the number of sheets of the booklet is 30, which is a relatively large number, the pressurizing force condition was changed from 0.4 MPa in Comparative Example 1 to 0.2 MPa. Under the condition, the bonding strength was 1.2 N/cm, which is lower as compared with that in Comparative Example 1, but the bonding strength was still sufficient. In addition, as for the depression, since the pressurizing force condition was changed so as to be decreased, the thickness W of the bonding layer S was about 10 μm, which is favorable, and the depression did not actually occur.

In Comparative Example 2, the thermocompression bonding operation was performed at a relatively low pressure of 0.2 MPa under the condition that the number of sheets of the booklet is two, which is a relatively small number. Since the number of sheets of the booklet was small, only the bonding strength of 0.21 N/cm was obtained, which was insufficient.

As described above, in the present embodiment, the operation condition of the thermocompression bonding unit 60 is changed between a case of forming a first booklet including a first number of sheets P and a case of forming a second booklet including a second number of sheets P more than the first number of sheets P. Specifically, in a case of forming the first booklet (for example, a booklet of which the number of sheets is two), the thermocompression bonding unit 60 was operated under a first operation condition so that the thickness W of the bonding layer S positioned closest to the pressurizing plate 62 in the first booklet becomes a first thickness. In a case of forming the second booklet (for example, a booklet of which the number of sheets is 30), the thermocompression bonding unit 60 was operated under a second operation condition so that the thickness W of the bonding layer S positioned closest to the pressurizing plate 62 in the second booklet becomes a second thickness larger than the first thickness. In the present embodiment, the first operation condition includes pressurizing, by the pressurizing plate 62, the first number of sheets P (for example, two sheets P) at a first pressure (for example, 0.4 MPa). The second operation condition includes pressurizing the second number of sheets (for example, 30 sheets) more than the first number of sheets at a second pressure (for example, 0.2 MPa) lower than the first pressure.

As a result, the thickness of the bonding layer S formed in the second booklet becomes larger than the thickness of the bonding layer S formed in the first booklet, and the occurrence of a depression can be suppressed. Therefore, a product such as a high-quality booklet can be provided. In addition, as the number of sheets of the booklet is larger, the bonding strength required for the bonding layer S is smaller, so that the bonding strength of the bonding layer S sufficient for forming the booklet can be maintained even at the second pressure as the pressurizing force of the pressurizing plate 62 at the time of forming the second booklet, which is a relatively low pressure.

Second Embodiment

Next, a second embodiment of the present invention will be described. In the second embodiment, a surface temperature of a pressurizing plate 62 is changed as an operation condition of a thermocompression bonding unit 60 to be changed according to the number of sheets of a booklet. Therefore, a configuration similar to that of the first embodiment will be described in a manner of omitting illustration or attaching the same reference numerals in the drawings.

In the present embodiment, a configuration focusing on the surface temperature (heating temperature) of the pressurizing plate 62 at the time of heating and pressurization will be described as a heating and pressurization condition which is the operation condition of the thermocompression bonding unit 60. As common conditions for making a booklet according to the second embodiment, Red Label Presentation (manufactured by Canon, A4 size) was used as a sheet P, and among the conditions of the thermocompression bonding operation by the thermocompression bonding unit 60, a pressurizing force of the pressurizing plate 62 was set to 0.2 MPa, and a heating time was set to 2.0 seconds (constant except for the surface temperature of the pressurizing plate 62). Further, when a booklet of which the number of sheets is two and a booklet of which the number of sheets is 30 were made, and when making the booklet of which the number of sheets is 30, heating and pressurization were performed by the thermocompression bonding unit 60 every five sheets as described above. The conditions at the time of each thermocompression bonding operation were as shown in Table 2 described below. That is, for example, in a case of making the booklet of which the number of sheets is 30, six thermocompression bonding operations were executed in total, and the conditions at that time were all the same conditions.

Table 2 shows booklet making conditions (the operation conditions of thermocompression bonding unit 60) and performance evaluation according to the present embodiment. In the second embodiment, the heating temperature of the pressurizing plate 62, that is, the surface temperature when the pressurizing plate 62 heats and pressurizes a sheet bundle is changed according to the number of sheets of the booklet. The bonding strength and a thickness W of a bonding layer S were observed for the bonding layer S positioned closest to the pressurizing plate 62 in the booklet.

TABLE 2

| | Number of sheets of booklet | Heating temperature | Bonding strength | | Depression | |
|---|---|---|---|---|---|---|
| | | | Experiment result | Determination | Thickness of bonding layer | Determination |
| Comparative Example 3 | 2 sheets | 220° C. | 0.80 N/cm | No problem | About 5 μm | No problem |
| | 30 sheets | 220° C. | 1.4 N/cm | No problem | About 5 μm | Occurred |
| Second Embodiment | 2 sheets | 220° C. | 0.80 N/cm | No problem | About 5 μm | No problem |
| | 30 sheets | 200° C. | 1.2 N/cm | No problem | About 10 μm | No problem |

In Comparative Example 3, the thermocompression bonding operation was performed on a sheet bundle at a relatively high heating temperature of 220° C. in order to increase the bonding strength of the booklet under the condition that the number of sheets of the booklet is two, which is a relatively small number. Therefore, a high bonding strength of 0.80 N/cm was achieved, indicating a sufficient bonding performance. In addition, the thickness W of the bonding layer S was about 5 μm, which may cause a depression. However, since the number of sheets of the booklet was small, the depression did not become apparent, and there was no depression problem.

On the other hand, even under the condition the number of sheets of the booklet is 30, which is a relatively large number, the thermocompression bonding operation was performed on the sheet bundle at 220° C. without changing the heating temperature. Therefore, the bonding strength was as high as 1.4 N/cm, but a depression occurred.

Next, the present embodiment will be described. In this configuration, the thermocompression bonding operation was performed at 220° C. in the same manner as in Comparative Example 3 under the condition that the number of sheets of the booklet is two, which is a relatively small number. Therefore, as for the performance evaluation result, the bonding strength was sufficient, the occurrence of a depression was not observed, and the result was favorable. Under the condition that the number of sheets of the booklet is 30, which is a relatively large number, the heating temperature condition was changed from 220° C. in Comparative Example 3 to 200° C. Under the condition, the bonding strength was 1.2 N/cm, which is lower as compared with that in Comparative Example 3, but the bonding strength was still sufficient. In addition, as for the depression, since the heating temperature condition was changed so as to be decreased, the thickness W of the bonding layer S was about 10 μm, which is favorable, and the depression did not actually occur.

As described above, in the present embodiment, the operation condition of the thermocompression bonding unit 60 is changed between a case of forming a first booklet including a first number of sheets P and a case of forming a second booklet including a second number of sheets P more than the first number of sheets P. Specifically, in a case of forming the first booklet (for example, a booklet of which the number of sheets is two), the thermocompression bonding unit 60 was operated under a first operation condition so that the thickness W of the bonding layer S positioned closest to the pressurizing plate 62 in the first booklet becomes a first thickness. In a case of forming the second booklet (for example, a booklet of which the number of sheets is 30), the thermocompression bonding unit 60 was operated under a second operation condition so that the thickness W of the bonding layer S positioned closest to the pressurizing plate 62 in the second booklet becomes a second thickness larger than the first thickness. In the present embodiment, the first operation condition includes that the surface temperature of the pressurizing plate 62 is a first temperature (for example, 220° C.). The second operation condition includes that the surface temperature of the pressurizing plate 62 is a second temperature (for example, 200° C.) lower than the first temperature.

As a result, the thickness of the bonding layer S formed in the second booklet becomes larger than the thickness of the bonding layer S formed in the first booklet, and the occurrence of a depression can be suppressed. Therefore, a product such as a high-quality booklet can be provided. In addition, as the number of sheets of the booklet is larger, the bonding strength required for the bonding layer S is smaller, so that the bonding strength of the bonding layer S sufficient for forming the booklet can be maintained even at the second temperature as the surface temperature of the pressurizing plate 62 at the time of forming the second booklet, which is a relatively low temperature.

Third Embodiment

Next, a third embodiment of the present invention will be described. In the third embodiment, a heating time of a pressurizing plate 62 for a sheet bundle is changed as an operation condition of a thermocompression bonding unit 60 to be changed according to the number of sheets of a booklet. Therefore, a configuration similar to that of the first embodiment will be described in a manner of omitting illustration or attaching the same reference numerals in the drawings.

In the present embodiment, a configuration focusing on a heating time of the pressurizing plate 62 at the time of heating and pressurization will be described as a heating and pressurization condition which is the operation condition of the thermocompression bonding unit 60. As common conditions for making a booklet according to the third embodiment, Red Label Presentation (manufactured by Canon, A4 size) was used as a sheet P, and among the conditions of the thermocompression bonding operation by the thermocompression bonding unit 60, a pressurizing force of the pressurizing plate 62 was set to 0.2 MPa, and a surface temperature of the pressurizing plate 62 was set to 200° C. (constant except for the heating time of the pressurizing plate 62). Further, when a booklet of which the number of sheets is two and a booklet of which the number of sheets is 30 were made, and when making the booklet of which the number of sheets is 30, heating and pressurization were performed by the thermocompression bonding unit 60 every five sheets as described above. The conditions at the time of each thermocompression bonding operation were as shown in Table 3 described below. That is, for example, in a case of making the booklet of which the number of sheets is 30, six thermocompression bonding operations were executed in total, and the conditions at that time were all the same conditions.

Table 3 shows booklet making conditions (the operation conditions of thermocompression bonding unit 60) and performance evaluation according to the present embodiment. In the third embodiment, the heating time of the pressurizing plate 62, that is, a time when the pressurizing plate 62 heats and pressurizes a sheet bundle in one thermocompression bonding operation is changed according to the number of sheets of the booklet. The bonding strength and a thickness W of a bonding layer S were observed for the bonding layer S positioned closest to the pressurizing plate 62 in the booklet.

condition was changed from 3.0 seconds in Comparative Example 4 to 2.0 seconds. Under the condition, the bonding strength was 1.2 N/cm, which is lower as compared with that in Comparative Example 4, but the bonding strength was still sufficient. In addition, as for the depression, since the heating temperature condition was changed so as to be decreased, the thickness W of the bonding layer S was about 10 μm, which is favorable, and the depression did not actually occur.

As described above, in the present embodiment, the operation condition of the thermocompression bonding unit 60 is changed between a case of forming a first booklet including a first number of sheets P and a case of forming a second booklet including a second number of sheets P more than the first number of sheets P. Specifically, in a case of forming the first booklet (for example, a booklet of which the number of sheets is two), the thermocompression bonding unit 60 was operated under a first operation condition so that the thickness W of the bonding layer S positioned closest to the pressurizing plate 62 in the first booklet becomes a first thickness. In a case of forming the second booklet (for example, a booklet of which the number of sheets is 30), the thermocompression bonding unit 60 was operated under a second operation condition so that the thickness W of the bonding layer S positioned closest to the pressurizing plate 62 in the second booklet becomes a second thickness larger than the first thickness. In the present embodiment, the first operation condition includes that pressurizing, by the pressurizing plate 62, the first

TABLE 3

| | Number of sheets of booklet | Heating time | Bonding strength: Experiment result | Bonding strength: Determination | Depression: Thickness of bonding layer | Depression: Determination |
|---|---|---|---|---|---|---|
| Comparative | 2 sheets | 3.0 seconds | 0.80 N/cm | No problem | About 5 μm | No problem |
| Example 4 | 30 sheets | 3.0 seconds | 1.4 N/cm | No problem | About 5 μm | Occurred |
| Third | 2 sheets | 3.0 seconds | 0.80 N/cm | No problem | About 5 μm | No problem |
| Embodiment | 30 sheets | 2.0 seconds | 1.2 N/cm | No problem | About 10 μm | No problem |

In Comparative Example 4, the thermocompression bonding operation was performed on a sheet bundle for a relatively long heating time of 3.0 seconds in order to increase the bonding strength of the booklet under the condition that the number of sheets of the booklet is two, which is a relatively small number. Therefore, a high bonding strength of 0.80 N/cm was achieved, indicating a sufficient bonding performance. In addition, the thickness W of the bonding layer S was about 5 μm, which may cause a depression. However, since the number of sheets of the booklet was small, the depression did not become apparent, and there was no depression problem.

On the other hand, even under the condition that the number of sheets of the booklet is 30, which is a relatively large number, the heating time was not changed and was set to 3.0 seconds. Therefore, the bonding strength was as high as 1.4 N/cm, but a depression occurred.

Next, the present embodiment will be described. In this configuration, the heating time was set to 3.0 seconds as in Comparative Example 4 under the condition that the number of sheets of the booklet is two, which is a relatively small number. Therefore, as for the performance evaluation result, the bonding strength was sufficient, the occurrence of a depression was not observed, and the result was favorable. Under the condition that the number of sheets of the booklet is 30, which is a relatively large number, the heating time number of sheets P (for example, two sheets P) for a first time (for example, 3.0 seconds). The second operation condition includes pressurizing the second number of sheets (for example, 30 sheets) more than the first number of sheets for a second time (for example, 2.0 seconds) shorter than the first time.

As a result, the thickness of the bonding layer S formed in the second booklet becomes larger than the thickness of the bonding layer S formed in the first booklet, and the occurrence of a depression can be suppressed. Therefore, a product such as a high-quality booklet can be provided. In addition, as the number of sheets of the booklet is larger, the bonding strength required for the bonding layer S is smaller, so that the bonding strength of the bonding layer S sufficient for forming the booklet can be maintained even with the second time as the heating time of the pressurizing plate 62 at the time of forming the second booklet, which is a relatively short time.

Fourth Embodiment

Next, a fourth embodiment of the present invention will be described. In the fourth embodiment, disposition of a post-processing device is changed with respect to the image forming apparatus 1S of the first embodiment. Therefore, a configuration similar to that of the first embodiment will be described in a manner of omitting illustration or attaching the same reference numerals in the drawings.

Figure 8:
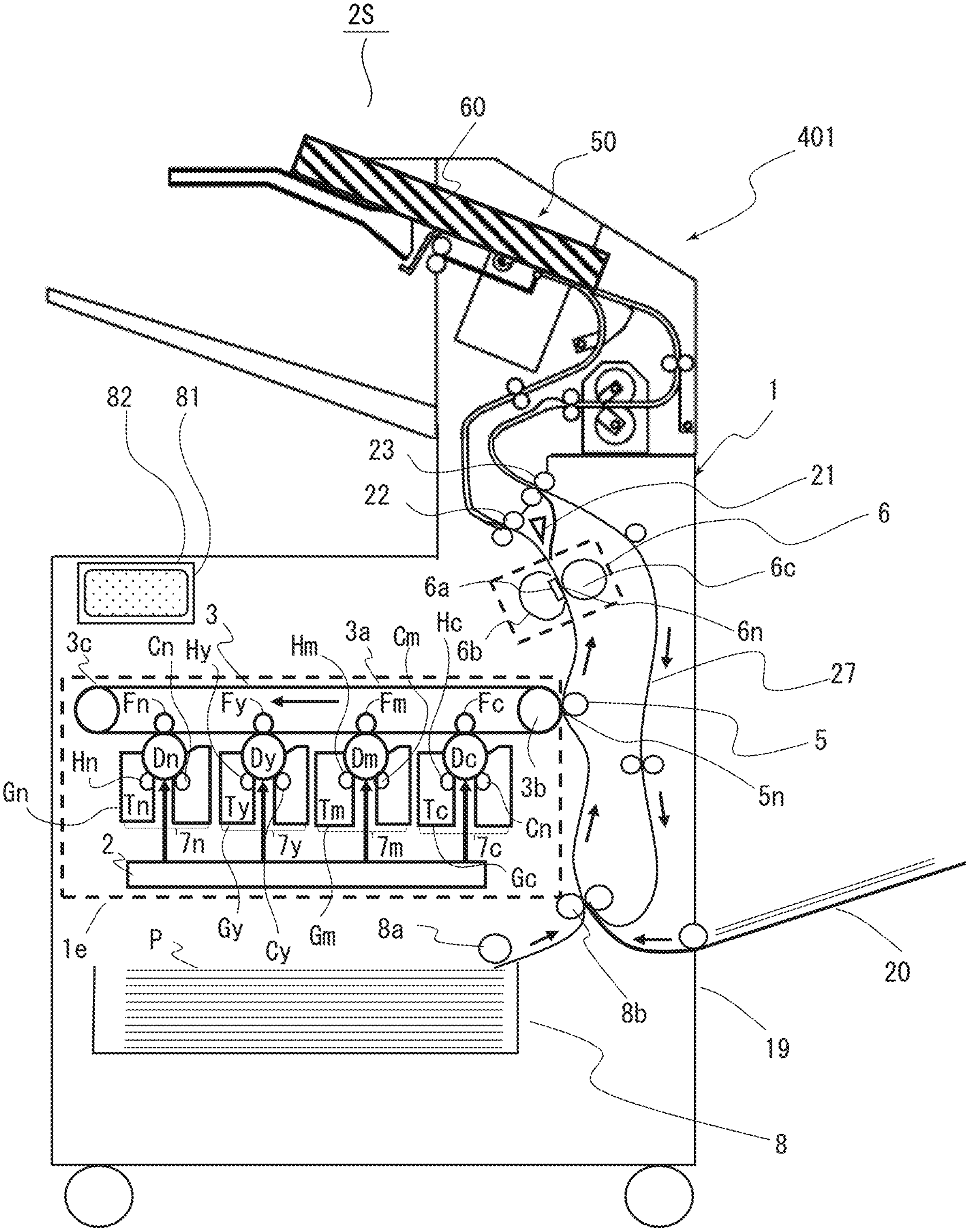
FIG. 8 is a schematic view illustrating a cross-sectional configuration of an image forming apparatus according to a second embodiment.

As illustrated in FIG. 8, an image forming apparatus 2S according to the fourth embodiment includes a printer unit 1 and a post-processing device 401. The post-processing device 401 is disposed above the printer unit 1 and includes a booklet making device 50. The booklet making device 50 includes a thermocompression bonding unit 60.

As described above, by disposing the post-processing device 401 above the printer unit 1, the intermediate conveyance unit 26 of the first embodiment can be omitted, and cost reduction can be achieved. In addition, an installation space for installing the image forming apparatus 2S can be reduced.

OTHER EMBODIMENTS

In any of the embodiments described above, for example, when making a booklet of which the number of sheets is 30, the thermocompression bonding unit 60 performs six thermocompression bonding operation in total under the common operation condition, but the present technology is not limited thereto. For example, the operation condition of thermocompression bonding unit 60 may be changed between the first thermocompression bonding operation and the second and subsequent thermocompression bonding operations.

In the first to third embodiments, in order to simplify the description, the pressurizing force, the heating temperature, and the heating time are individually changed according to the number of sheets of the booklet, but the present technology is not limited thereto. That is, from the viewpoint of suppressing the occurrence of a depression when the number of sheets of the booklet is large, if the thickness of the bonding layer S is within a certain range, any two or more conditions among the conditions of the pressurizing force, the heating temperature, and the heating time may be changed according to the number of sheets of the booklet. At this time, even in a case where one condition is a condition that increases the strength of heating and pressurization by the thermocompression bonding unit 60, another condition may be a condition that decreases the strength of heating and pressurization by the thermocompression bonding unit 60 as long as the thickness of the bonding layer S finally falls within a certain range.

In any of the embodiments described above, the operation condition of the thermocompression bonding unit 60 is changed by the control unit 90 provided in the post-processing device 4, but the present technology is not limited thereto. The operation condition of the thermocompression bonding unit 60 may be changed by, for example, a control unit provided in the printer unit 1 or the intermediate conveyance unit 26, or may be changed by receiving a signal from an external computer or the like connected to the image forming apparatuses 1S and 2S.

The present invention can also be implemented by processing in which a program for implementing one or more functions of the above-described embodiments is supplied to a system or a device via a network or a storage medium, and one or more processors in a computer of the system or the device read and execute the program. The present invention can also be implemented by a circuit (for example, an application specific integrated circuit (ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-100817, filed Jun. 20, 2023, which is hereby incorporated by reference herein in its entirety.

What is claimed is:

1. A booklet forming device for forming a booklet by bonding a plurality of sheets, the booklet forming device comprising:

a sheet support portion configured to support sheet onto which a toner for bonding is applied; and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer, wherein in a case of forming a first booklet including a first number of sheets, the bonding unit is operated under a first operation condition so that a thickness of the bonding layer positioned closest to the pressurizing member in the first booklet becomes a first thickness, and in a case of forming a second booklet including a second number of sheets more than the first number of sheets, the bonding unit is operated under a second operation condition different from the first operation condition so that the thickness of the bonding layer positioned closest to the pressurizing member in the second booklet becomes a second thickness larger than the first thickness.

2. The booklet forming device according to claim 1, wherein the first operation condition includes pressurizing, by the pressurizing member, the first number of sheets at a first pressure, and the second operation condition includes pressurizing, by the pressurizing member, the second number of sheets at a second pressure lower than the first pressure.

3. The booklet forming device according to claim 1, wherein the first operation condition includes that a surface temperature of the pressurizing member is a first temperature, and the second operation condition includes that a surface temperature of the pressurizing member is a second temperature lower than the first temperature.

4. The booklet forming device according to claim 3, wherein the bonding unit includes a heater configured to heat the pressurizing member.

5. The booklet forming device according to claim 1, wherein the first operation condition includes that the pressurizing member heats and pressurizes the first number of sheets for a first time, and the second operation condition includes that the pressurizing member heats and pressurizes the second number of sheets for a second time shorter than the first time.

6. The booklet forming device according to claim 1, wherein after heating and pressurizing a first sheet bundle, the pressurizing member forms one booklet by heating and pressurizing a second sheet bundle placed on the first sheet bundle to bond the first sheet bundle and the second sheet bundle.

7. The booklet forming device according to claim 1, wherein the bonding unit is operated such that a bonding strength between the pair of sheets forming a booklet is 0.3 N/cm or more.

8. An image forming apparatus comprising:

an image forming unit configured to form an image on a sheet and apply the toner for bonding onto the sheet; and the booklet forming device according to claim 1.

9. The image forming apparatus according to claim 8, wherein the image forming unit forms a bonding toner image by using the toner for bonding in a bonding region on the sheet, and forms an image using a toner for image formation in an image region different from the bonding region on the sheet.

10. A booklet forming device for forming a booklet by bonding a plurality of sheets, the booklet forming device comprising:

a sheet support portion configured to support sheet onto which a toner for bonding is applied; and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer, wherein in a case of forming a first booklet including a first number of sheets, the pressurizing member pressurizes the first number of sheets at a first pressure, and in a case of forming a second booklet including a second number of sheets more than the first number of sheets, the pressurizing member pressurizes the second number of sheets at a second pressure lower than the first pressure.

11. The booklet forming device according to claim 10, wherein after heating and pressurizing a first sheet bundle, the pressurizing member forms one booklet by heating and pressurizing a second sheet bundle placed on the first sheet bundle to bond the first sheet bundle and the second sheet bundle.

12. The booklet forming device according to claim 10, wherein the bonding unit is operated such that a bonding strength between the pair of sheets forming a booklet is 0.3 N/cm or more.

13. An image forming apparatus comprising:

an image forming unit configured to form an image on a sheet and apply the toner for bonding onto the sheet; and the booklet forming device according to claim 10.

14. The image forming apparatus according to claim 13, wherein the image forming unit forms a bonding toner image by using the toner for bonding in a bonding region on the sheet, and forms an image using a toner for image formation in an image region different from the bonding region on the sheet.

15. A booklet forming device for forming a booklet by bonding a plurality of sheets, the booklet forming device comprising:

a sheet support portion configured to support sheet onto which a toner for bonding is applied; and a bonding unit including a pressurizing member and configured to form a bonding layer by heating and pressurizing the sheets, supported by the sheet support portion, by the pressurizing member to melt the toner for bonding, and bond a pair of sheets to each other by the bonding layer, wherein in a case of forming a first booklet including a first number of sheets, a surface temperature of the pressurizing member is set to a first temperature, and in a case of forming a second booklet including a second number of sheets more than the first number of sheets, the surface temperature of the pressurizing member is set to a second temperature lower than the first temperature.

16. The booklet forming device according to claim 15, wherein the bonding unit includes a heater configured to heat the pressurizing member.

17. The booklet forming device according to claim 15, wherein after heating and pressurizing a first sheet bundle, the pressurizing member forms one booklet by heating and pressurizing a second sheet bundle placed on the first sheet bundle to bond the first sheet bundle and the second sheet bundle.

18. The booklet forming device according to claim 15, wherein the bonding unit is operated such that a bonding strength between the pair of sheets forming a booklet is 0.3 N/cm or more.

19. An image forming apparatus comprising:

an image forming unit configured to form an image on a sheet and apply the toner for bonding onto the sheet; and the booklet forming device according to claim 15.

20. The image forming apparatus according to claim 19, wherein the image forming unit forms a bonding toner image by using the toner for bonding in a bonding region on the sheet, and forms an image using a toner for image formation in an image region different from the bonding region on the sheet.

* * * * *